(12) United States Patent
Wade et al.

(10) Patent No.: US 8,924,377 B2
(45) Date of Patent: Dec. 30, 2014

(54) PREFERENCE STACK

(71) Applicant: Digital Map Products, Inc., Irvine, CA (US)

(72) Inventors: Geoffrey Wade, Laguna Niguel, CA (US); Stanley Cody, Camas, WA (US); Steven Noland, Laguna Hills, CA (US); Mark Reyes, Laguna Niguel, CA (US); Ann Schwab, Irvine, CA (US)

(73) Assignee: Digital Map Products, Inc., Irvine, CA (US)

( * ) Notice: Subject to any disclaimer, the term of this patent is extended or adjusted under 35 U.S.C. 154(b) by 0 days.

(21) Appl. No.: 13/872,510

(22) Filed: Apr. 29, 2013

(65) Prior Publication Data

US 2013/0246934 A1  Sep. 19, 2013

Related U.S. Application Data

(63) Continuation-in-part of application No. 13/110,764, filed on May 18, 2011, now Pat. No. 8,433,706.

(60) Provisional application No. 61/346,186, filed on May 19, 2010.

(51) Int. Cl.
  *G06F 17/30* (2006.01)
  *G06Q 30/06* (2012.01)
  *G06F 3/0484* (2013.01)

(52) U.S. Cl.
  CPC ............ *G06F 3/04842* (2013.01); *G06Q 30/06* (2013.01); *G06F 17/30241* (2013.01)
  USPC ........................................................ 707/723

(58) Field of Classification Search
  None
  See application file for complete search history.

(56) References Cited

U.S. PATENT DOCUMENTS

| | | | |
|---|---|---|---|
| 5,293,479 A | 3/1994 | Quintero et al. | |
| 5,852,810 A | 12/1998 | Sotiroff et al. | |
| 6,292,792 B1* | 9/2001 | Baffes et al. | 706/45 |
| 6,868,525 B1 | 3/2005 | Szabo | |
| 7,089,237 B2 | 8/2006 | Turnbull et al. | |
| 7,181,438 B1 | 2/2007 | Szabo | |

(Continued)

FOREIGN PATENT DOCUMENTS

JP  2007164287 A  6/2007

OTHER PUBLICATIONS

International Search Report and Written Opinion issued in corresponding PCT/US2011/037040 on Feb. 9, 2012, 9 pages.

*Primary Examiner* — Jay Morrison
(74) *Attorney, Agent, or Firm* — Procopio Cory Hargreaves & Savitch LLP

(57) ABSTRACT

Systems and methods for customizing a display of records. In an embodiment, a plurality of records are identified, and a virtual map comprising representations of the records is generated. In response to a selection of a property attribute, a range of values for the attribute is determined and divided into a plurality of segments. Each record is associated with one of the segments, and a graph is generated comprising visual representations. Each visual representation in the graph corresponds to one of the segments and comprises a representation of a number of the records which are associated with the corresponding segment. In response to selection of one or more of the visual representations, the virtual map is updated to visually identify a subset of the representations of the records which are associated with the segment corresponding to the selected visual representation(s).

16 Claims, 15 Drawing Sheets

(56) References Cited

U.S. PATENT DOCUMENTS

| | | | |
|---|---|---|---|
| 7,353,114 B1 | 4/2008 | Rohlf et al. | |
| 7,406,467 B1 | 7/2008 | White | |
| 7,466,244 B2 | 12/2008 | Kimchi | |
| 7,508,787 B2 * | 3/2009 | Doshi et al. | 370/328 |
| 7,548,915 B2 | 6/2009 | Ramer et al. | |
| 7,564,377 B2 | 7/2009 | Kimchi et al. | |
| 7,688,306 B2 | 3/2010 | Wehrenberg et al. | |
| 7,707,140 B2 | 4/2010 | Leishman et al. | |
| 7,716,217 B2 | 5/2010 | Marston et al. | |
| 7,725,331 B2 | 5/2010 | Schurenberg et al. | |
| 7,746,343 B1 | 6/2010 | Charaniya et al. | |
| 7,777,648 B2 | 8/2010 | Smith et al. | |
| 7,797,299 B2 | 9/2010 | Thrasher | |
| 7,844,594 B1 | 11/2010 | Holt et al. | |
| 7,920,072 B2 | 4/2011 | Smith et al. | |
| 7,925,982 B2 | 4/2011 | Parker et al. | |
| 7,933,929 B1 | 4/2011 | McClendon et al. | |
| 8,001,577 B2 | 8/2011 | Fries | |
| 8,027,879 B2 | 9/2011 | Ramer et al. | |
| 8,041,020 B2 | 10/2011 | Drewry et al. | |
| 8,060,389 B2 | 11/2011 | Johnson et al. | |
| 8,073,565 B2 | 12/2011 | Johnson | |
| 8,103,445 B2 | 1/2012 | Smith et al. | |
| 8,122,370 B2 | 2/2012 | Hoguet | |
| 8,131,271 B2 | 3/2012 | Ramer et al. | |
| 8,156,128 B2 | 4/2012 | Ramer et al. | |
| 8,171,022 B2 | 5/2012 | Johnston | |
| 8,195,133 B2 | 6/2012 | Ramer et al. | |
| 8,200,676 B2 | 6/2012 | Frank | |
| 8,510,349 B1 * | 8/2013 | Puttick | 707/805 |
| 2003/0101063 A1 | 5/2003 | Sexton et al. | |
| 2004/0220906 A1 | 11/2004 | Gargi et al. | |
| 2006/0022048 A1 | 2/2006 | Johnson | |
| 2006/0080313 A1 | 4/2006 | Freire | |
| 2007/0027887 A1 | 2/2007 | Baldwin | |
| 2007/0043770 A1 * | 2/2007 | Goodrich et al. | 707/104.1 |
| 2007/0060114 A1 | 3/2007 | Ramer et al. | |
| 2007/0061198 A1 | 3/2007 | Ramer et al. | |
| 2007/0061242 A1 | 3/2007 | Ramer et al. | |
| 2007/0061243 A1 | 3/2007 | Ramer et al. | |
| 2007/0061244 A1 | 3/2007 | Ramer et al. | |
| 2007/0061245 A1 | 3/2007 | Ramer et al. | |
| 2007/0061246 A1 | 3/2007 | Ramer et al. | |
| 2007/0061303 A1 | 3/2007 | Ramer et al. | |
| 2007/0061317 A1 | 3/2007 | Ramer et al. | |
| 2007/0073717 A1 | 3/2007 | Ramer et al. | |
| 2007/0073718 A1 | 3/2007 | Ramer et al. | |
| 2007/0073719 A1 | 3/2007 | Ramer et al. | |
| 2007/0094042 A1 | 4/2007 | Ramer et al. | |
| 2007/0100650 A1 | 5/2007 | Ramer et al. | |
| 2007/0100651 A1 | 5/2007 | Ramer et al. | |
| 2007/0100652 A1 | 5/2007 | Ramer et al. | |
| 2007/0100653 A1 | 5/2007 | Ramer et al. | |
| 2007/0100805 A1 | 5/2007 | Ramer et al. | |
| 2007/0100806 A1 | 5/2007 | Ramer et al. | |
| 2007/0118533 A1 | 5/2007 | Ramer et al. | |
| 2007/0168354 A1 | 7/2007 | Ramer et al. | |
| 2007/0192294 A1 | 8/2007 | Ramer et al. | |
| 2007/0192318 A1 | 8/2007 | Ramer et al. | |
| 2007/0198485 A1 | 8/2007 | Ramer et al. | |
| 2007/0239724 A1 | 10/2007 | Ramer et al. | |
| 2007/0288427 A1 | 12/2007 | Ramer et al. | |
| 2008/0009268 A1 | 1/2008 | Ramer et al. | |
| 2008/0214148 A1 | 9/2008 | Ramer et al. | |
| 2008/0214149 A1 | 9/2008 | Ramer et al. | |
| 2008/0214150 A1 | 9/2008 | Ramer et al. | |
| 2008/0214151 A1 | 9/2008 | Ramer et al. | |
| 2008/0214152 A1 | 9/2008 | Ramer et al. | |
| 2008/0214153 A1 | 9/2008 | Ramer et al. | |
| 2008/0214154 A1 | 9/2008 | Ramer et al. | |
| 2008/0214155 A1 | 9/2008 | Ramer et al. | |
| 2008/0214156 A1 | 9/2008 | Ramer et al. | |
| 2008/0214157 A1 | 9/2008 | Ramer et al. | |
| 2008/0214162 A1 | 9/2008 | Ramer et al. | |
| 2008/0214166 A1 | 9/2008 | Ramer et al. | |
| 2008/0214204 A1 | 9/2008 | Ramer et al. | |
| 2008/0215428 A1 | 9/2008 | Ramer et al. | |
| 2008/0215429 A1 | 9/2008 | Ramer et al. | |
| 2008/0215475 A1 | 9/2008 | Ramer et al. | |
| 2008/0215557 A1 | 9/2008 | Ramer et al. | |
| 2008/0215623 A1 | 9/2008 | Ramer et al. | |
| 2008/0242279 A1 | 10/2008 | Ramer et al. | |
| 2008/0270220 A1 | 10/2008 | Ramer et al. | |
| 2009/0029687 A1 | 1/2009 | Ramer et al. | |
| 2009/0216627 A1 * | 8/2009 | Carden et al. | 705/11 |
| 2009/0222329 A1 | 9/2009 | Ramer et al. | |
| 2009/0234711 A1 | 9/2009 | Ramer et al. | |
| 2009/0234745 A1 | 9/2009 | Ramer et al. | |
| 2009/0234861 A1 | 9/2009 | Ramer et al. | |
| 2009/0240568 A1 | 9/2009 | Ramer et al. | |
| 2009/0240569 A1 | 9/2009 | Ramer et al. | |
| 2009/0240586 A1 | 9/2009 | Ramer et al. | |
| 2010/0063877 A1 | 3/2010 | Soroca et al. | |
| 2010/0070487 A1 | 3/2010 | Fetsch | |
| 2010/0076845 A1 | 3/2010 | Ramer et al. | |
| 2010/0076994 A1 | 3/2010 | Soroca et al. | |
| 2010/0082431 A1 | 4/2010 | Ramer et al. | |
| 2010/0094878 A1 | 4/2010 | Soroca et al. | |
| 2010/0121705 A1 | 5/2010 | Ramer et al. | |
| 2010/0153211 A1 | 6/2010 | Ramer et al. | |
| 2010/0205541 A1 | 8/2010 | Rapaport et al. | |
| 2010/0217663 A1 | 8/2010 | Ramer et al. | |
| 2011/0125393 A1 * | 5/2011 | Williams et al. | 701/200 |
| 2011/0264692 A1 * | 10/2011 | Kardell | 707/769 |

* cited by examiner

PREFERENCE STACK

PRIORITY

This application is a continuation in part of and claims priority to U.S. Non-provisional patent application Ser. No. 13/110,764, entitled "Preference Stack" and filed on May 18, 2011, which claims priority to U.S. Provisional Patent App. No. 61/346,186, entitled "Preference Stack" and filed on May 19, 2010, the entireties of both of which are hereby incorporated herein by reference.

BACKGROUND

1. Field of the Invention

This invention relates to graphical user interfaces and to systems and methods for providing enhanced searching, filtering, and display of complex data sets in graphical user interfaces.

2. Description of the Related Art

Finding relevant data in large databases that include vast amounts of information, such as a geographic information system (GIS) databases, can be particularly challenging for users. Developers of applications that mine data from complex data stores have struggled to provide clear and concise methods and interfaces for searching such complex databases.

For example, returning to the GIS example, GIS databases can be configured to manage complex datasets associated with geographic location data. A GIS database can include information such as road information, address information, topographical information, hydrological information, power grid information, and/or other information that can be associated with geographic information. Professionals in various fields may use the same GIS database for very different uses. For example, archaeologists might use a GIS database to study topographical information of an area to understand how the people from a particular point may have made use of the land and to identify possibly points for in depth study. In contrast, an urban planner might use the same GIS database for planning a new development based on existing infrastructure.

SUMMARY

The embodiments disclosed herein generally relate to a graphical user interface which provides enhanced searching, filtering, and display of complex data sets in graphical user interfaces.

In an embodiment, a system for customizing a display of property records in combination with a virtual map is disclosed. The system comprises: at least one computer processor; and at least one executable software module configured to, when executed by the at least one computer processor, identify a plurality of property records based on a plurality of preference criteria, generate a virtual map comprising representations of the plurality of property records, receive a selection of one of a plurality of property attributes, determine a range of values for the selected property attribute based on the plurality of property records, divide the range of values into a plurality of discrete segments, associate each of the plurality of property records with one of the plurality of discrete segments, generate a first graph comprising a plurality of first visual representations, wherein each of the plurality of first visual representations corresponds to one of the plurality of discrete segments, comprises a visual representation of a number of the plurality of property records which are associated with the corresponding discrete segment, and is selectable by a user, receive a selection of one or more of the plurality of first visual representations, and, in response to the selection of one or more of the plurality of first visual representations, update the virtual map to visually identify a subset of the representations of the plurality of property records which are associated with the discrete segment corresponding to the selected one or more of the plurality of first visual representations.

In some embodiments, the at least one executable software module may be further configured to generate a second graph comprising a plurality of second visual representations, wherein each of the plurality of second visual representations corresponds to one of a subset of two or more of the plurality of preference criteria and comprises a visual representation of a number of the plurality of property records which satisfy the corresponding preference criterion. Furthermore, the at least one executable software module may receive a selection of one or more of the plurality of second visual representations; and, in response to the selection of one or more of the plurality of second visual representations, update the virtual map to visually identify a subset of the representations of the plurality of property records which satisfy the preference criteria corresponding to the selected one or more of the plurality of second visual representations. Alternatively or additionally, the at least one executable software module may, in response to the selection of one or more of the plurality of first visual representations, update the second graph such that each of the plurality of second visual representations comprises a visual representation of a number of the plurality of property records which satisfy the corresponding preference criterion and are associated with the discrete segment corresponding to the selected one or more of the plurality of first visual representations.

In an additional embodiment, a method for customizing a display of property records in combination with a virtual map is disclosed. The method comprises, by at least one hardware processor: identifying a plurality of property records based on a plurality of preference criteria; generating a virtual map comprising representations of the plurality of property records; receiving a selection of one of a plurality of property attributes; determining a range of values for the selected property attribute based on the plurality of property records; dividing the range of values into a plurality of discrete segments; associating each of the plurality of property records with one of the plurality of discrete segments; generating a first graph comprising a plurality of first visual representations, wherein each of the plurality of first visual representations corresponds to one of the plurality of discrete segments, comprises a visual representation of a number of the plurality of property records which are associated with the corresponding discrete segment, and is selectable by a user; receiving a selection of one or more of the plurality of first visual representations; and, in response to the selection of one or more of the plurality of first visual representations, updating the virtual map to visually identify a subset of the representations of the plurality of property records which are associated with the discrete segment corresponding to the selected one or more of the plurality of first visual representations.

In some embodiments, the method may further comprising generating a second graph comprising a plurality of second visual representations, wherein each of the plurality of second visual representations corresponds to one of a subset of two or more of the plurality of preference criteria and comprises a visual representation of a number of the plurality of property records which satisfy the corresponding preference criterion. Furthermore, the method may comprise receiving a selection of one or more of the plurality of second visual representations; and, in response to the selection of one or more of the plurality of second visual representations, updating the virtual map to visually identify a subset of the representations of the plurality of property records which satisfy the preference criteria corresponding to the selected one or more of the plurality of second visual representations. Alternatively or additionally, the method may comprise, in response to the selection of one or more of the plurality of first visual representations, updating the second graph such that each of the plurality of second visual representations comprises a visual representation of a number of the plurality of property records which satisfy the corresponding preference criterion and are associated with the discrete segment corresponding to the selected one or more of the plurality of first visual representations.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
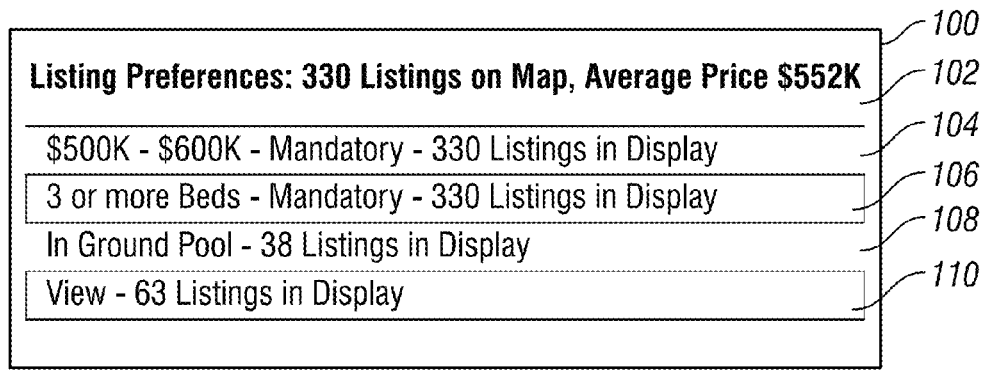
FIG. 1 illustrates a preference stack user interface, according to an embodiment.

Systems and methods for searching, filtering, and displaying large sets of complex data are provided. After reading this description, it will become apparent to one skilled in the art how to implement the invention in various alternative embodiments and alternative applications. Although various embodiments of the present invention are described herein, it is understood that these embodiments are presented by way of example only, and not limitation. As such, this description of various alternative embodiments should not be construed to limit the scope or breadth of the present invention. Furthermore, unless otherwise specified, when references are made to an action or step being performed, the steps are performed by the preference stack implemented on the client device or the server.

According to an embodiment, a preference stack interface is provided that allows a user to quickly and easily customize the display of a set of data. The preference stack interface allows a user to select from a set of predefined criteria or to define new criteria for determining what data should be displayed and how the data should be presented to the user. According to an embodiment, the preference stack interface comprises an ordered list (also referred to herein as a stack) of criteria objects based on the relative importance of each of the criteria. Each criteria object corresponds to an attribute of the data set to be presented to the user. In an embodiment, the preference stack interface can be integrated into a real estate search program that displays properties to the user based on search criteria provided by the user. For example, the user can add criteria, such as property location, listing price, proximity to a school and/or other landmark, and property amenities, such as number of bedrooms, bathrooms, and/or square footage. Examples of such an interface are discussed in detail below. The user can add a criteria object to the stack for each of the attributes of the properties that the user would like to see. One skilled in the art will recognize that the preference stack can be used to display other types of data and is not limited to display data related to real estate listings, as described in the example above.

According to an embodiment, the criteria objects can be classified as either mandatory or important, and this classification determines how the criteria associated with the criteria objects influences the visualization of the data set being displayed to the user. Mandatory criteria are criteria that must be included in the data in order for the data to be displayed to the user. For example, returning once again to the real estate example described above, if the user adds a mandatory criteria object to the preference stack that includes the requirement "list price<$500K," only properties having a list price that is less than $500,000 will be displayed to the user. According to an embodiment, mandatory criteria objects are moved to the top of the preference stack, indicating their relative importance with respect to the data to be displayed to the user.

Important criteria are criteria are criteria that are not required in order for the data to be displayed. Important criteria can be added to the preference stack in order of relative importance, and the important criteria can be associated with a weight relative to the position in the stack. For example, those criteria that are placed higher in the stack will be given greater emphasis when displaying the data set, while those lower in the stack will be given less emphasis when displaying the results of a query to the user. If there are multiple important criteria in the preference stack, simply changing the order of the important criteria can affect the display of the results. A detailed description of various ways in which data can be emphasized is provided below. Furthermore, a detailed description of how a user can interact with the preference stack to add, delete, or reorder criteria is also provided below.

Criteria can be positive or negative, that is the criteria can contribute to or detract from the weighting. Furthermore, the criteria can be simple or complex. Simple criteria can comprise a simple Boolean expression, while complex criteria can comprise multiple expressions in combination to form a single criteria object.

According to an embodiment, displaying the emphasis or deemphasis of results (indicating relative ranking) can be accomplished in different ways. For example, the order in which results are listed can be used to emphasize or deemphasize results (e.g., those results matching the most criteria can be at front or top of list), different rendering styles can be applied to emphasize or deemphasize (e.g., different colors, boldness, size, and/or opacity can be used for emphasis), and/or data can be animated differently depending on the matched criteria.

According to an embodiment, the preference stack can be used by users to visually interact with the criteria objects and the data. For example, user events on the preference stack user interface can cause the interface to highlight results that meet the criterion. According to an embodiment, other criteria user interface objects may react to the highlighted criteria based on the subset of that criteria object that also meets the highlighted criteria. This interactivity makes the preference stack an easy to use decision support tool. The user can interact with the preference stack to make determinations between multiple alternatives that meet the user's requirements to varying degrees.

For example, in an embodiment each criterion can display statistics on the data displayed that meet that particular criteria. The statistics can simply be a count or other aggregated information, an interactive chart or other summation device. As the user highlights a particular criterion in the preference stack, the statistics for each criterion get reduced to the subset that would be created if the highlighted criterion were mandatory. This allows the user to weigh different options in a selection process.

I. Example Use Cases

The following example embodiment illustrates how the preference stack can be used. This example is not intended to limit the scope of the application to the specific embodiment disclosed in this example.

The preference stack is particularly applicable to software applications where a user must make a selection determination from multiple possible options. The user knows what is important to them; however, he or she can have multiple criteria, many of which are not mandatory and the user may need to compromise when making a selection.

A shopping scenario may be used to illustrate one application of the preference stack. In this example, the user has a budget for purchasing a particular type of merchandise, and the user has a set of criteria, such as price and features that the user would like to satisfy. But, if the user includes all of the desirable features, the user's budget would be exceeded.

By establishing a preference stack and interacting with the various criteria in the preference stack, the end user in this shopping scenario can quickly assess the cost impact of a particular criterion by selecting the criterion object in the preference stack that is associated with that criterion. For example, in some embodiments, the user can select a criterion object by moving a pointer or other indicator over the criterion object using a mouse or other user input device that allows the user to control the position of the pointer. In an embodiment, the cost impact of a particular criterion can be shown by a statistical shift in average price or price spread as the end user mouses over each non-mandatory criterion. Moving a criterion up the stack can result in visual emphasis of items that meet that criterion. In an embodiment, movement of the mouse pointer icon over a criterion can cause the interface to temporarily emphasize those objects that meet the criterion while de-emphasizing those objects that do not meet the criterion. For example, the interface can be automatically updated to temporarily fade out objects that do not meet the criterion over which the user has moved the mouse pointer icon. When the user moves the mouse pointer icon off of the criterion, the user interface can be automatically updated to return to a view of the objects rendered according to the full preference stack.

Some benefits of the preference stack method over conventional search techniques include, but are not limited to:
(a) Discovery of "Hidden Gems"—traditional searching techniques limit results only to the criterion specified. In a conventional system, a user could remove the non-mandatory criterion from the search, but the search could return too many results to easily display and process, and the user might not be able to see the impact of the criteria. Alternatively, if a user has multiple non-mandatory criteria, the user could submit a series of narrow search results that each include a different set of criteria and attempt to correlate the results. In contrast, the flexibility of the preference stack can often allow users to find items that would not otherwise have been found had the user, instead, utilized a stricter search method which required the user to specify non-mandatory criterion that might unnecessarily limit the results of the search.
(b) Simpler User Interface—Selection of preferences into a stack is much simpler to operate than large search forms in which users fill in the search criterion, as are used in many conventional systems.
(c) Faster Decision-Making—through user interaction with the stack, the user can generate a short list much faster, testing multiple "what-if" scenarios by seeing the data display changing as they move the mouse over different criteria. The user can rapidly narrow their focus to what is most important to them.

Embodiments of the present invention can be used with, but are not limited to, interactive mapping applications. The following provides an example of how the preference stack can help a user make a decision using multiple criteria. These use cases are merely example embodiments of the preference stack and are not intended to limit the systems and methods disclosed herein to any specific embodiments.

There are numerous applications within the interactive mapping domain that can use the preference stack systems and methods disclosed herein. Maps have the benefit that they can display a very large amount of data simultaneously. Maps are used widely in decision support systems, as over 80% of the world's data can be related to some location in space. The following are some sample use cases:
(a) Hotel/Resort selection on a travel web site. The preference stack can be integrated into an interactive mapping application that facilitates:
(i) Selecting general travel locations based on general criteria, such as "snorkeling in tropical water," "eating in four star restaurants," "prefer low crime," "accept U.S. currency," and/or other criteria related to the types of travel experience for which the user is searching. The selected criterion can then be added to a preference stack and an interactive map that displays general travel locations (e.g. states, regions, or countries) that match the criteria entered by the user can be displayed. Various techniques can be used to emphasize those general locations that match the criteria entered by the user, such as the technique described above.

(ii) Once the user has chosen a specific general location of interest, a map of the selected location that includes hotels that meet the user's criteria can be displayed. The criteria can include a plurality of mandatory and non-mandatory criteria, such as a preferred price range, and various amenities. In an embodiment, mandatory criteria can be displayed at the top of the stack while the non-mandatory criteria can be displayed lower in the stack. In an embodiment, the user can drag a criterion to move that criterion up the preference stack to indicate that the criterion is more important to the user and properties matching that criterion should be given greater emphasis on the map than those properties matching criteria lower on the stack. Similarly, the user can drag a criterion to move that criterion down the preference stack to indicate that the criterion is less important to the user and properties matching that criterion should be given less emphasis on the map than those properties matching criteria higher on the stack. The properties can be displayed according to preference stack ordering preferences, and properties that meet more of the user's preferences can be emphasized on the map while those that meet less to none of the user's preference can be deemphasized on the map. For example, those properties meeting multiple criteria can be rendered using a larger and more opaque representation on the map, while those properties that meet less to none of the user's criteria can be rendered to be smaller and less opaque, or not rendered at all.

(b) Land Developer Site Acquisition—the preference stack can be integrated into software mapping applications for research, analysis, and decision-making for land developers searching for sites to acquire. According to an embodiment, the preference stack can be integrated into a Digital Mapping Products LandVision™ product.

(c) Retail Site Selection—a user who is tasked with selecting a site for a new retail outlet could use the preference stack integrated into a digital mapping product for displaying and selecting commercial real estate locations. The user could enter a set of mandatory and non-mandatory criteria and prioritize the criteria by adjusting the order of specific criterion in the stack. Commercial real estate properties matching one or more criteria can be displayed on the map. Each property can be rendered, such that properties matching more criteria and/or more important criteria are emphasized.

(d) City/Neighborhood Compatibility—a user could use the preference stack to select a city and/or neighborhood that is most compatible with the user. For example, the user may enter and prioritize a set of criteria in the preference stack, such as "low crime rate," "good schools," "proximity to work," "proximity to family," "transportation," and "living expenses." In an embodiment, the preference stack can alter the thematic display of city polygons or neighborhood polygons based on aggregated and normalized data for each polygonal area. Changing the order of each of the criteria varies the thematic map display of each polygonal area, with more intensity for more desirable areas and lower intensity for less desirable areas. If the user moves a criterion up or down, the map may change interactively.

(e) City Budget Allocation—a preference stack can be used by public works to allocate funding based on need, spending priorities, politics, and/or other criteria.

(f) Real Estate Listing Search—a user can search for real estate that matches a set of criteria entered by the user. An embodiment of a real-estate listing search application that includes a preference stack is described in further detail below.

As an example, a preference stack can be used by buyers, sellers, and/or real estate agents during the real estate selection process. The listing data for properties for sale can comprise a map layer that includes the location and the address of a property for sale, and a series of listing attributes of the property for sale. The listing attributes can include both structured and unstructured data. Some examples of the listing attributes that can be included in the listing attributes for a property are: list price, status (e.g., sold, active, pending), date listed, date sold, number of bedrooms, living square footage, land acreage, number of baths, number of floors, number of garages, available parking, swimming pool and/or swimming pool description, view and/or view description, agent inspection notes, prospect inspection notes, association, association facilities, tract, and/or tract model.

According to an embodiment, there can be hundreds of such listing attributes associated with a property. The examples provided above are merely some of the attributes that can be provided and are in no way intended to be limiting.

According to an embodiment, multiple layers of spatially sourced information can be combined. For example, the listing attribute information described above can be combined with other layers of information, such as school locations, school listings, flood zones, demographics, special tax districts, road traffic, other spatially sourced information, or a combination thereof.

In an embodiment, the preference stack can be displayed as a user interface panel within an application. The preference stack user interface panel can contain a list of criteria interface panels that provide the user interface for each of the criterion objects.

In an embodiment, complex criterion objects can be created that that can include both structured and unstructured data. For example, an application designer for a real estate application can include a criterion "Pool or Room for a Pool" that makes a determination whether a property listing meets the criteria for the criterion object based on information from the "Pool" field of the listing attributes, the homeowner association facilities (if any), and/or land area associated with the property.

Criterion objects can then be presented to the end user and added to the preference stack. As a criterion object is added to the preference stack, the preference stack may display how many listed properties meet that criterion object. The preference stack may report, for the total view, how many properties are in the view and other possible statistics.

According to an embodiment, if a criterion is made mandatory, all listings on the map that do not meet that criterion disappear and the preference stack statistics reflect the change by showing a lower number of listings. As other criteria are added, the map may continue to change to reflect the order of criteria in the preference stack.

FIG. 1 illustrates an example of a preference stack 100 with each criterion in stack order. With this stack order, the map would only show properties that meet the Price Criterion 104 and the Beds Criterion 106. It would also have a preference to "In Ground Pool" 108 over "View" 110. That is, if the mandatory criteria were met and there are 2 properties, one with a view and no pool, and one with a pool and no view, the pool property would be more prominent in the view. In an embodiment, the property with the pool can be rendered on the map to appear more opaque than the property with the pool. Any style attribute could be set based on the criteria order within the preference stack 100.

If the user were to simply move the "View" Criterion 110 above the "In Ground Pool" Criterion 108, the map display would be updated so that the view listings would be rendered as more opaque than the pool listings. If a property met all the criteria, it would be fully opaque. Again, other styles or combinations of styles could be used for similar affect.

According to an embodiment, the user can also pan or zoom the map display to change the view of the geographic area displayed in the map view. In response to an "On Pan" event, the statistics on the preference stack 100 can be updated to reflect the properties shown in the updated map view. In an embodiment, the Listing count 102 may change for the preference stack summary and each of the criteria in the preference stack 100.

Figure 2:
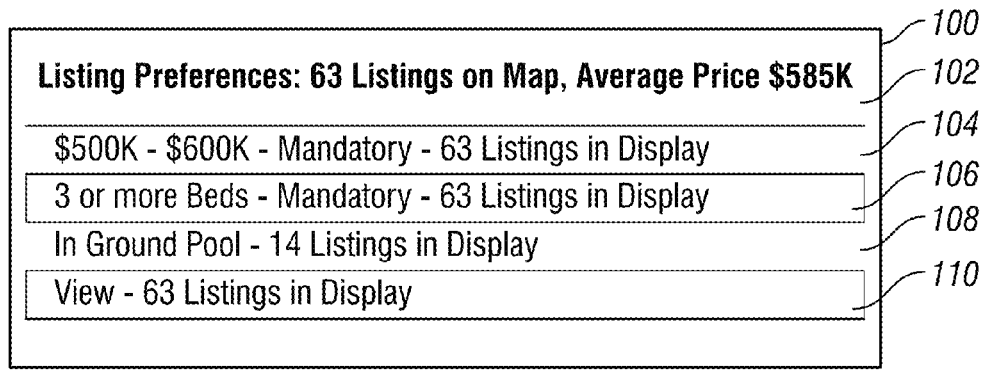
FIG. 2 illustrates an updated preference stack user interface, according to an embodiment.

According to an embodiment, if the user places the mouse pointer over a particular criterion object in the preference stack 100, the map display can be updated to emphasize the listings that meet that particular criterion object. According to an embodiment, the emphasis can be enhanced using an animation effect to bring attention to the properties that satisfy the criteria associated with the criterion object. Furthermore, the other criteria and their associated statistics may be updated to reflect the selected criterion object. In the preference stack example described above, on a mouse over of the "View" criterion object 110, the user would see the updated preference stack user interface 100 illustrated in FIG. 2.

As a result, the user can easily see which properties meet each criterion within the current set and which do not. Also in this example, the "View" criterion 110 increased the average price to $585,000, and 14 properties have both view and pools. While the user keeps the mouse over the "View" criterion object 110, the listings that do not meet the view criterion may fade away. If the user mouses away from the "View" Criterion user interface object 110, the preference stack 100 and display may return to normal display.

Figure 3:
FIG. 3 illustrates a preference stack in conjunction with a real estate listing application, according to an example embodiment.

FIGS. 3-10 illustrate an embodiment of the preference stack in a real estate listing application. FIG. 3 illustrates a set of 4,580 real estate listings in the Los Angeles area of Southern California. In this embodiment, each property listing has an associated house icon rendered on the map which corresponds to the location of the property.

According to an embodiment, the listing data can be streamed from a real estate application server across one or more networks, such as the Internet, to a client device. The client device can be configured to receive and cache the received data in a local data cache, and to execute a client application on the client device that can display the data to the user in an interactive user interface. For example, the client device can be a personal computer system, including, but not limited to, a laptop or netbook, or the client device can be a mobile device, such as a personal digital assistant or mobile phone. According to some alternative embodiments, a thin client can be implemented on the client device where much of the data is cached on the application server and the application server performs most of the processing on the data.

Figure 4:
FIG. 4 illustrates a preference stack in conjunction with a real estate listing application with the preference stack interface visible, according to an example embodiment.

FIG. 4 illustrates the application interface illustrated in FIG. 3 with the preference stack interface 100 visible. The preference stack interface displays a count 402 of the number of listings that are currently displayed on the map interface, as well as the average price 404 for the properties that are displayed. The preference stack 100 does not yet include any criterion objects in FIGS. 3 and 4. Therefore, none of the properties are emphasized. In the embodiment illustrated in FIG. 4, there are 4,580 properties displayed in the map area of the user interface 100 and the average price of the properties displayed is $413,733.

Figure 5:
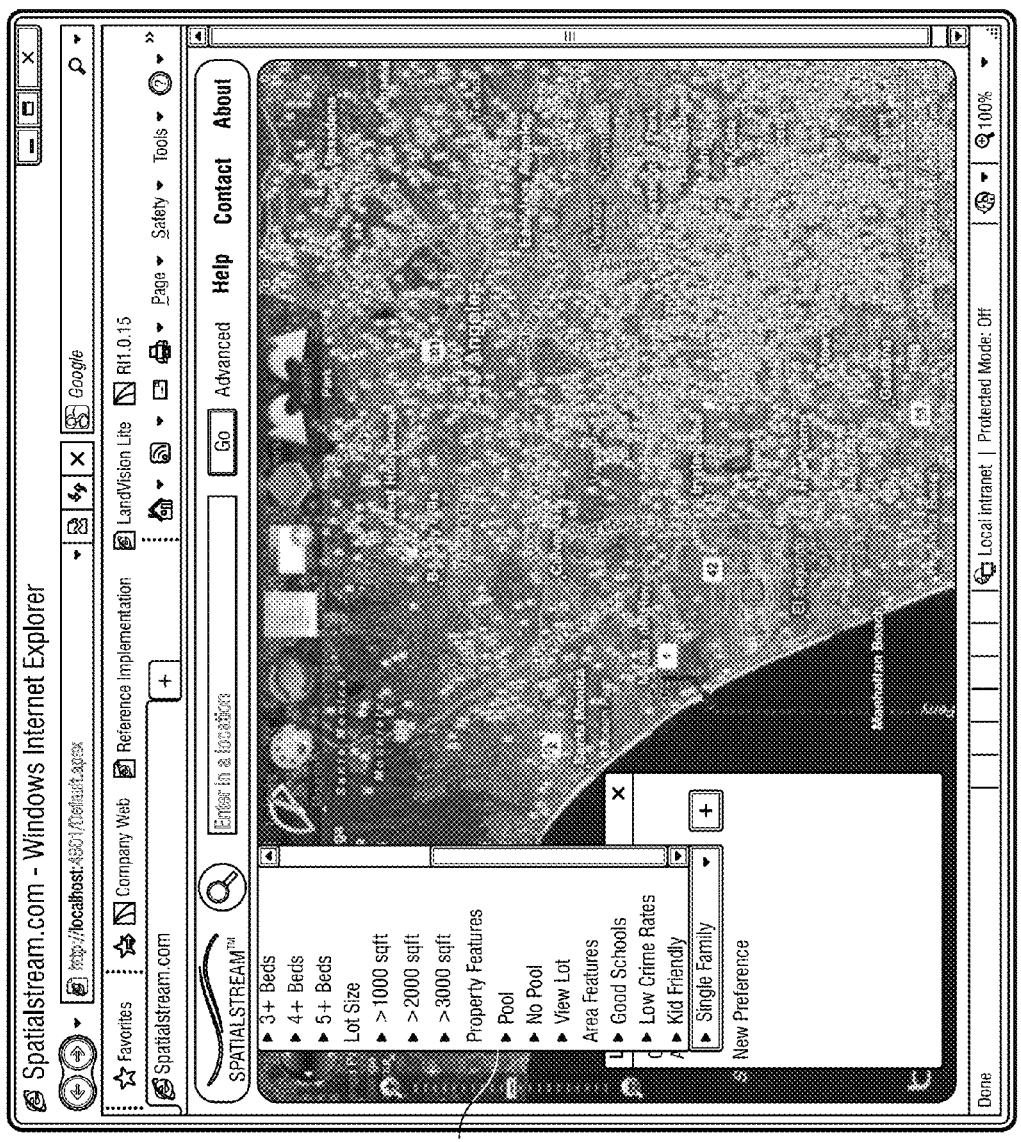
FIG. 5 illustrates a preference stack in conjunction with a real estate listing application with a listing of available preferences, according to an example embodiment.

FIG. 5 illustrates a listing of some of the available preferences 500 that can be selected by a user to add a new criterion object to the preference stack. In the embodiment illustrated in FIG. 5, the user can select from various attributes associated with property listings, such as the number of bedrooms, whether the property includes a pool, whether the property has a view, and the quality of the surrounding schools. The preference stack 100 can be updated to display the number of properties associated with each of the criterion objects.

Figure 6:
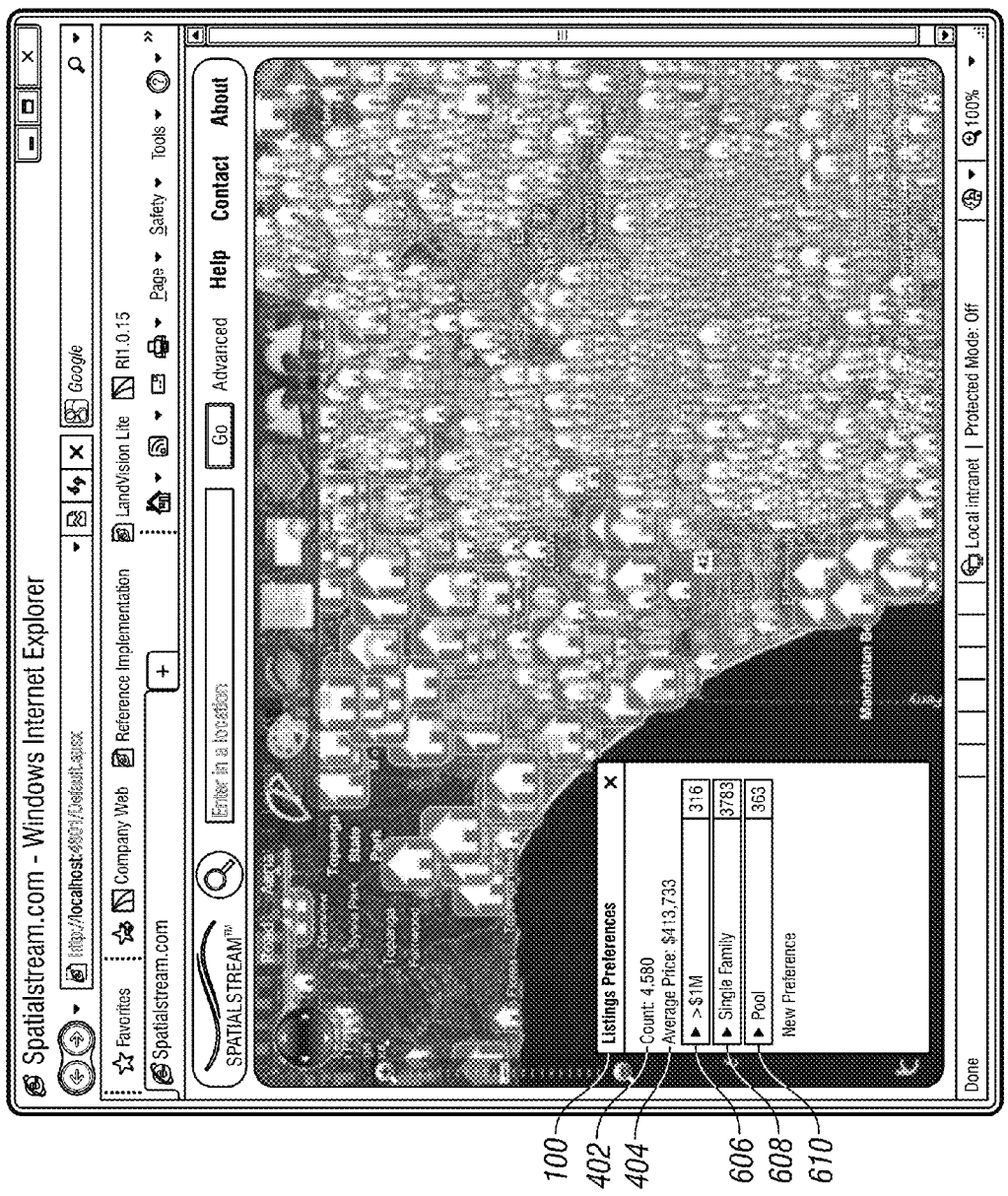
FIG. 6 illustrates a preference stack in conjunction with a real estate listing application after non-mandatory criteria have been added to the preference stack, according to an example embodiment.

FIG. 6 illustrates the preference stack from FIGS. 4 and 5 after three non-mandatory criteria have been added to the preference stack. The first criterion object 606 selects listings in which the list price of the property is greater than $1 million. The second criterion object 608 selects listings for single-family homes, and the third criterion object 610 selects listing in which the property has a pool. As can be seen in FIG. 6, the addition of non-mandatory criteria does not change the count value of 4,580, because the non-mandatory criteria, in this embodiment, do not exclude any properties. Of the 4,580 properties displayed on the map interface in this example, 316 properties have a list price of over $1 million, 3,783 properties are single family dwellings, and 363 properties have a pool.

As can be seen from FIG. 6, the size and opacity of the house icons associated with each of the properties can be rendered to reflect how closely the property matches the criteria that have been added to the preference stack 100. In the embodiments illustrated in FIGS. 3-10, properties matching only the criteria closer to the top of the preference stack 100 are rendered to be larger and more opaque than properties that only match criteria closer to the bottom of the preference stack 100. For example, a property matching only the "greater than $1 million" criterion would have a corresponding icon that is rendered larger and more opaque than the icon associated with a property matching only the "has pool" criterion.

Figure 7:
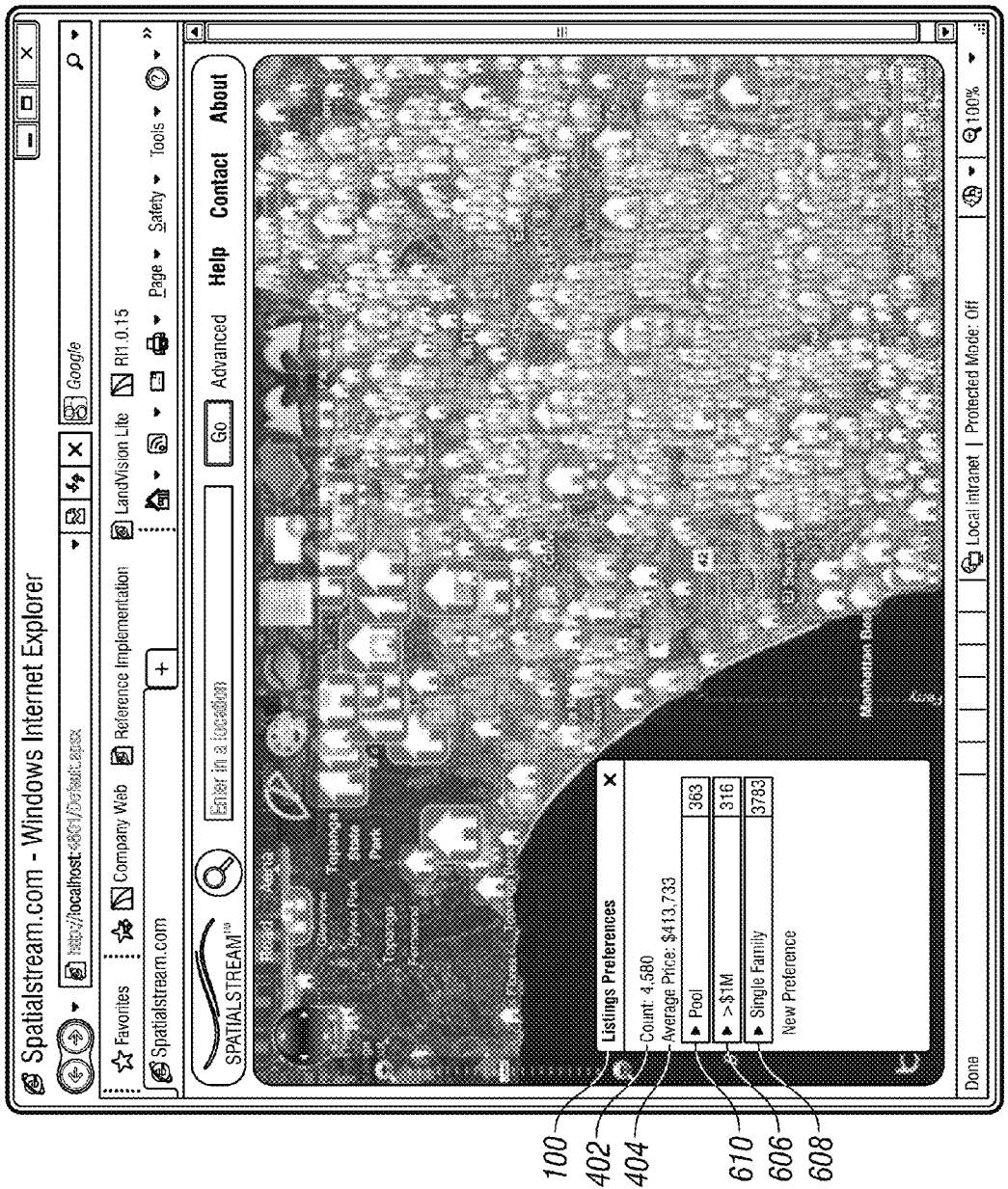
FIG. 7 illustrates a preference stack in conjunction with a real estate listing application after a criterion object has been moved, according to an example embodiment.

FIG. 7 illustrates the preference stack 100 of FIG. 6 where the "pool" criterion object 610 has been moved from the bottom to the top of the stack 100. According to an embodiment, a user can "drag and drop" criterion objects by clicking on a criterion object and dragging the object to reposition the object in the preference stack 100. As can be seen from FIG. 7, the "pool" criterion object 610 in this example is given more weight by the preference stack 100 than the "greater than $1 million" criterion 606, and those properties having a pool have been rendered for display to emphasize the listings that have pools. The overall counts associated with each of the criterion objects have not changed in this example, since none of the criteria are mandatory, just the emphasis on the properties based on the new order of the criterion objects on the preference stack 100. According to an embodiment, the preference stack 100 can operate on cached listing data that has been streamed to the client device, and when the preference stack 100 is reordered by the user, the listing data from the local cache can be used to generate the updated map view where greater emphasis is placed on the properties having, e.g., pools.

Figure 8:
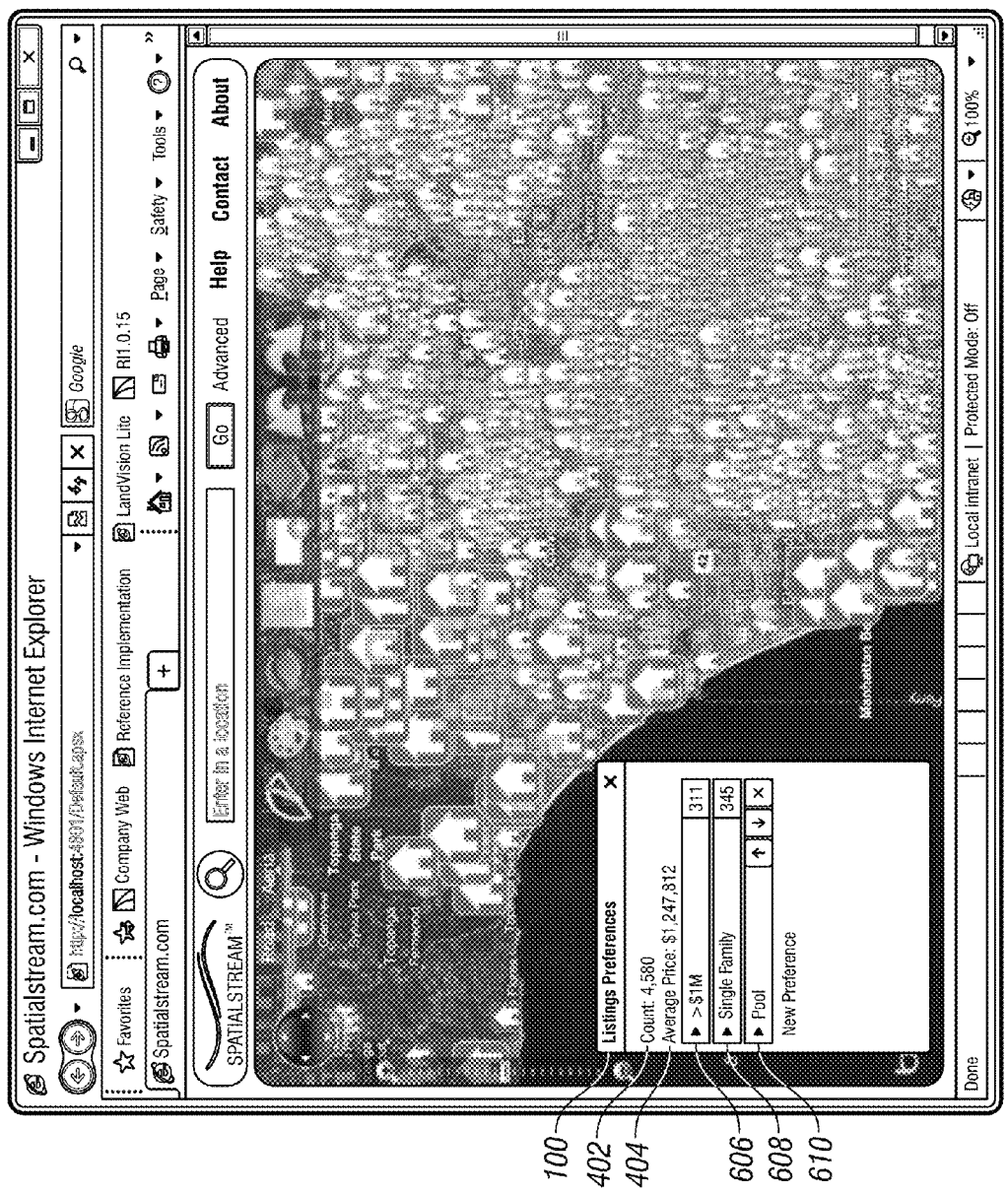
FIG. 8 illustrates a preference stack in conjunction with a real estate listing application after a criterion object has been selected, according to an example embodiment.

FIG. 8 illustrates an example of the preference stack 100 of FIG. 6, where the user has selected the "pool" criterion object 610 in order to emphasize only those objects that meet the criterion. According to an embodiment, the preference stack interface 100 can be configured to determine that a user has selected a particular criterion object by detecting a "mouse over" event where the user has placed the mouse pointer over the criterion object. In response to the mouse over event, the interface 100 can be updated to display only those properties that match the criterion associated with the selected criterion object. For example, in the embodiment illustrated in FIG. 8, when the user moves the mouse over the pool criterion object 610, only properties that include a pool are displayed, and the statistics displayed in the preference stack 100 are updated to reflect only those properties that include pools. The overall count in FIG. 8 has been updated to reflect the number of properties that include pools (363), as are the counts associated with the other criterion objects in the stack. In this example, 345 single family properties include a pool, and 311 of the properties having a list price greater than $1 million have a pool. This functionality of the preference stack 100 allows a user to quickly obtain a view of the properties that meet the criterion of a particular criterion object by selecting that criterion object.

Figure 9:
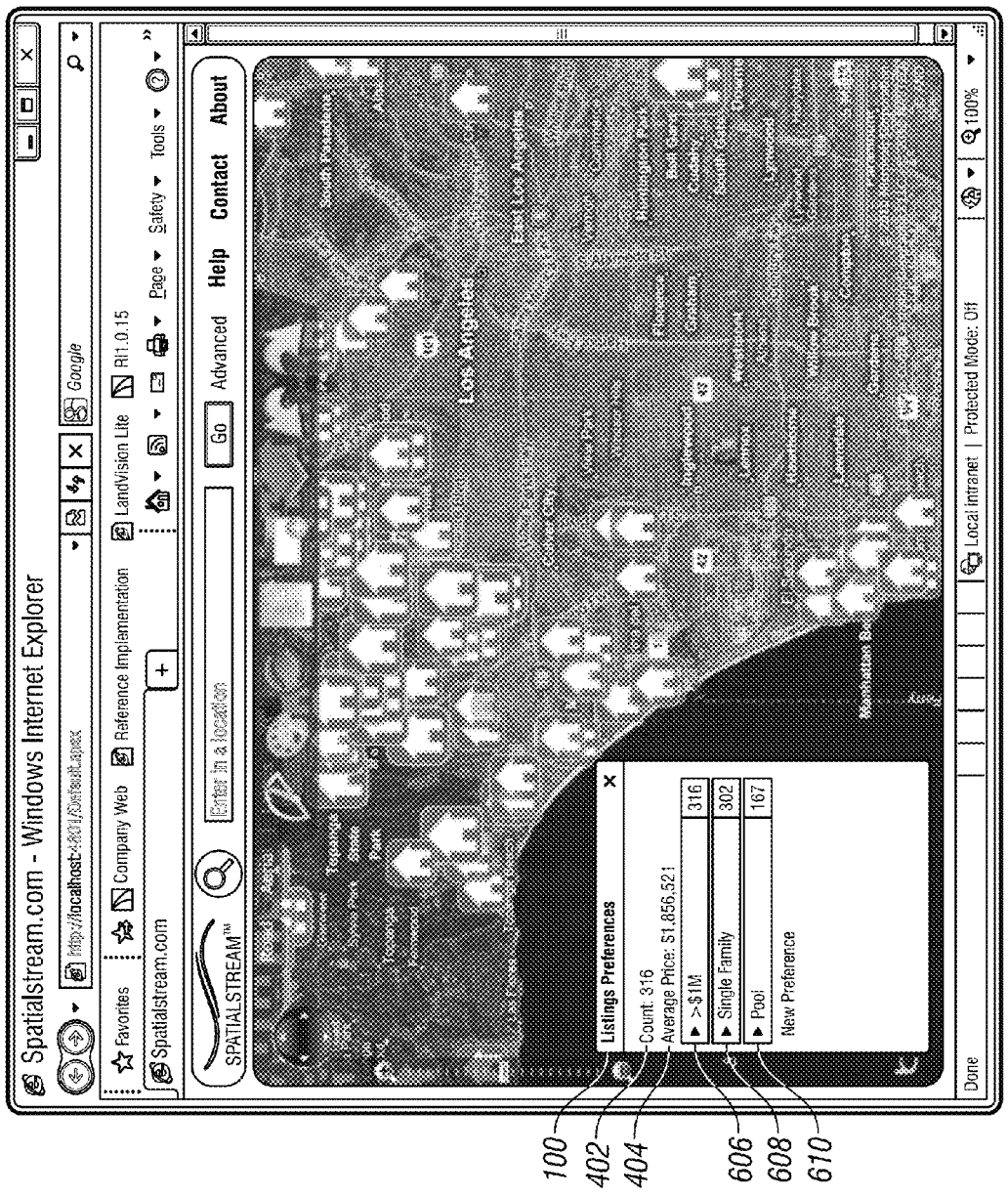
FIG. 9 illustrates a preference stack in conjunction with a real estate listing application after a criterion object has been made mandatory, according to an example embodiment.

FIG. 9 illustrates the preference stack 100 from FIG. 6, where the "greater than $1 million" list price criterion object 606 has been made mandatory. Therefore, in this example only listings for properties where the price is greater than $1 million are displayed on the map interface. As can be seen in FIG. 9, the mandatory criterion object can be placed at the top of the preference stack 100 and can be rendered in a different color, pattern, size, etc., to distinguish the mandatory criterion objects from the non-mandatory criterion objects. According to an embodiment, the preference stack user interface 100 can be configured to allow a user to change a non-mandatory criterion object to a mandatory criterion object, and vice versa. The preference stack user interface 100 may include an interface object (not shown), such as a checkbox, that the user can click to convert a criterion object from mandatory to non-mandatory or from non-mandatory to mandatory.

Figure 10:
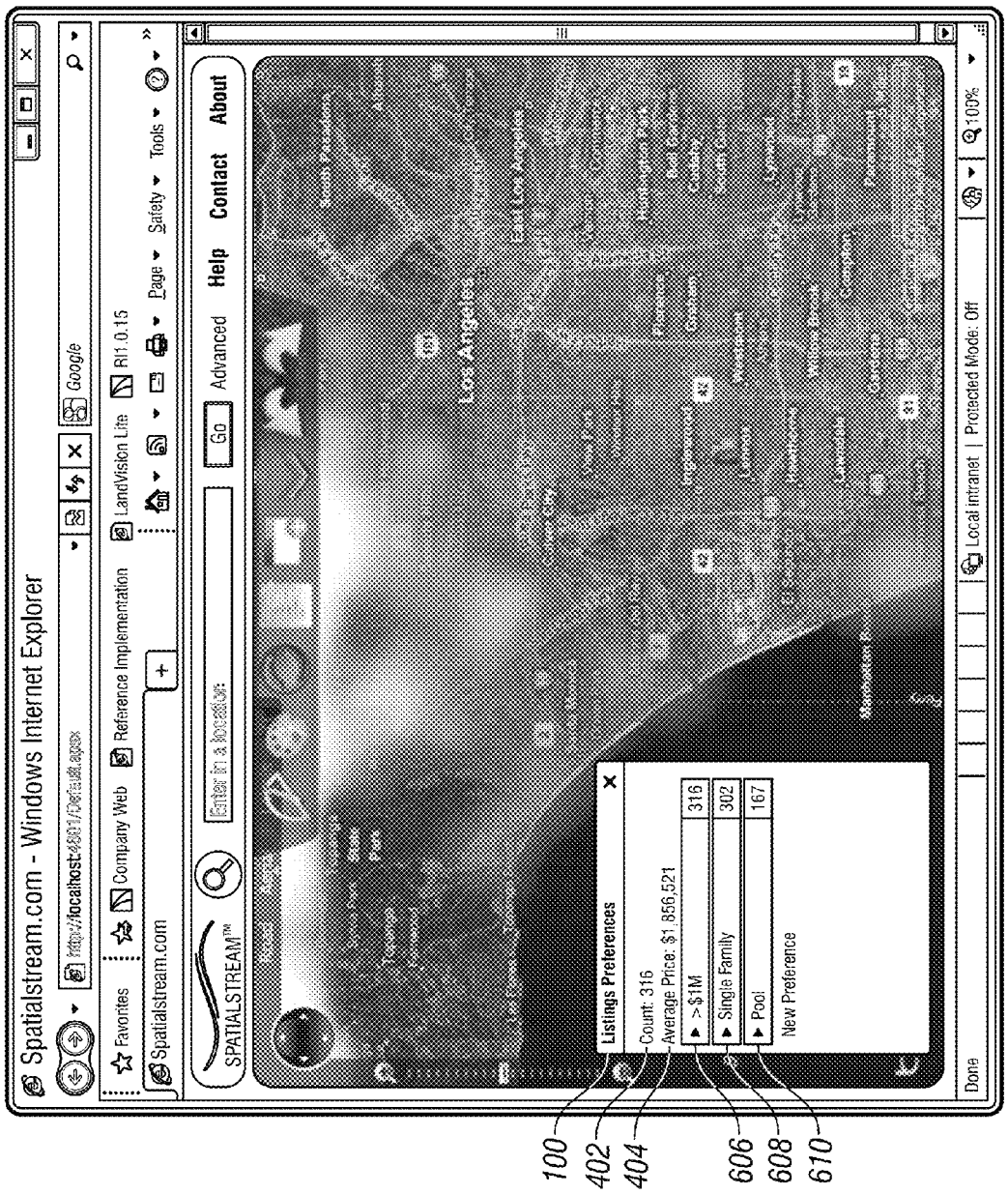
FIG. 10 illustrates a preference stack in conjunction with a real estate listing application in which a "heat map" type interface is used, according to an example embodiment.

FIG. 10 illustrates an alternative embodiment of the interface illustrated in FIG. 9, in which a "heat map" type interface is used to identify areas having listings that match the user's preferences rather than using individual icons to represent each property that matches the user's preferences. In the embodiment illustrated in FIG. 10, areas having a higher concentration of homes that match the criteria in the preference stack 100 are highlighted with a whiter, lighter, or more opaque color and area, while areas having less of a concentration are highlighted in a darker or more opaque color (in this example, red). In an embodiment, areas where there are no matching properties are not highlighted.

II. Design

A. Use Case

In one embodiment of a real estate application, a user can turn on a listing layer to see different houses displayed at their corresponding geographic locations on a map interface. The user may click on a "preferences" button and a "preferences panel" can be displayed. The user can modify, add, or delete criteria using the preferences interface. For example, the user can add two criteria: "price between $500K-600K" and "SFR" for single family residence and select an option to set these two criteria to mandatory. The preference stack 100 is updated with the two new mandatory criteria, and the map is updated to display representations of only those houses that match the mandatory criteria. Other houses that do not meet the mandatory criteria can be removed from the map view.

The user can also add additional non-mandatory criteria. For example, the user can add criteria for "property has a pool" and "property has large lot." In some embodiments, the user can enter a size of the lot in square feet, square meters, acres, or other measures of area, or select from predefined ranges. If two new non-mandatory criterion objects are added to the preference stack 100, the corresponding results/map view can be updated to reflect the new criterion objects. For example, those properties that match the mandatory criteria, but do not match one or more of the non-mandatory criteria, can be rendered to be less opaque than those properties. Those properties that match all of the criteria (both mandatory and non-mandatory) can be rendered as fully opaque.

According to an embodiment, a non-mandatory criterion that is lower down on the stack has less of a weight than a non-mandatory criterion that is farther up in the stack. If a property does not meet one of the criteria farther up the stack, the property can be rendered less opaque to deemphasize the property. A property that does not meet one of the criteria lower down the stack, but does meet criteria higher up the stack can be rendered as less than fully opaque because it does not meet all the criteria, but could be more opaque than properties that do not meet the higher criteria. A property that meets multiple criteria can also be rendered more opaque than a property that meets fewer criteria included in the preference stack.

According to an embodiment, if the user moves the mouse pointer over the "must have a pool" criterion object 610 in the preference stack 100, the map interface can be updated to render the property listings having no pool as blurry and/or non-opaque while those property listings having a pool can be rendered as opaque. The counts and statistics associated with the preference stack 100 can also be updated to reflect only those properties that have pools. When the user moves the mouse pointer off of the "must have pool" criterion object 610, the previous counts and statistics can be displayed and the map view may be updated to the previous view of the listings according to the full preference stack 100.

According to an embodiment, each criteria panel within the preference stack user interface maintains its own statistics based on the active criteria, not just the active criteria panel. Hence, moving the mouse pointer over a criteria panel may not only highlight those records in the view that meet that particular "active" criteria but other criteria can update to reflect their stats when constrained by the selected criteria.

According to an embodiment, the criterion objects can also include negative criterion. For example, a criterion object for "no pool" can be created if the user prefers a property without a pool.

B. Data Layer

According to an embodiment, a data layer can be used to manage the data that is used in conjunction with the preference stack. The data layer can be configured to deliver streaming data from the server to the client device. The data layer is also referred to herein as a streaming feature layer (SFL).

According to an embodiment, data can be delivered to the client in "buckets." A bucket is a set of records that that are retrieved by the preference stack or the application with which the preference stack is being used. The size of each bucket can be determined by performing data density requests. According to an embodiment, the data in a bucket is retrieved in a compact binary data stream. Buckets can be sized to meet minimum and maximum desirable thresholds to optimize the number of requests relative to how much data is retrieved in each bucket.

For example, if a user moves around in a map view of an application, the data layer can determine whether additional data from the server is required for the updated view. If additional data is necessary, the data layer can request just the necessary data from the server and add the data to the local cache. The data layer can then just retrieve the additional buckets of data needed to cover the view from the local cache.

According to an embodiment, the preference stack can be implemented on a display and rendering platform that supports SFL. The vector geometry and attributes required for criteria assessments can be efficiently streamed to the client device and held in a non-persistent memory cache on the client device. As the user interacts with the preference stack and/or the application, additional data can be fetched from the server and moved into the client cache. For example, in the real estate use case illustrated above, the user can pan or zoom to the map. As the user changes the zoom level or moves the view of the map, additional data may be requested from the server and streamed to the client to support the new view of the map. The additional data streamed to the client from the server is added to the client cache to allow the preference stack to operate on this local copy of the data without requiring additional data fetches to the server.

According to an embodiment, the preference stack can be implemented using the following SFL components: Inspectors and Filters.

1. Inspectors

According to an embodiment, an inspector 1108 can be created for each preference stack criterion object. An inspector 1108 can be configured to add a tag to each SFL memory cache record to indicate whether that record meets the criterion associated with the criterion object. An inspector 1108 can be created when a new criterion object is added to the preference stack. The inspector 1108 can be applied to the existing data in the memory cache as well as incoming data being streamed from the server. The tags created by the inspector 1108 can be stored in the cache. In an embodiment, these tags are not updated for each display operation. Absence of a tag associated with a criterion object may indicate for a particular record that the record in the cache does not meet the criterion associated with the criterion object.

2. Filters

In an embodiment, display filters 1106 can be used to determine which records from the cache should be displayed. Filters 1106 can also manipulate the data associated with a particular record. Filters 1106 can be directly inserted into the display loop for each view update operation. According to an embodiment, a filter 1106 may be used to:

(1) Eliminate records from the display that do not include tags for each of the mandatory criterion objects.

(2) Calculate a score for each record that does include tags for all of the mandatory criteria. The score can be used for determining the style to be used when rendering the record for display (e.g., transparency, symbol size, etc.). According to an embodiment, the filter 1106 can apply an algorithm to decrease the score incrementally for each non-mandatory criterion that is not met by a record. The level of score deduction can be higher for criteria that are higher up in the preference stack. As a result, if a criterion object is moved up or down in the Stack, the filter 1106 can change the style of records displayed according to changes in the scores. Thus, the user can see variations in the style of the rendering of records as the user moves criterion objects up or down on the preference stack.

(3) Calculate overall view statistics and criteria statistics for each of the criterion objects that meet all of the mandatory criteria and add the records to the display list for each criterion and to an overall display list for all records in the view. As illustrated in the examples above, various statistics can be calculated and displayed as part of the preference stack, and when a user selects a particular criterion object in the preference stack, the display list associated with the selected criterion object can be used to animate the "in view" records that meet that particular criterion.

According to an embodiment, layer display rules can also be implemented. A layer display rule can be used to set the display style of each individual record during the rendering process, based on the attributes of the record. The layer display rule can be used with the preference stack to determine how a particular record should be rendered based on the score calculated by the display filter. The layer display rule can be used to control how the score is converted into a symbol size, opacity, color intensity, or any other rendering style characteristic supported by the client environment.

According to an embodiment, map events can also be implemented. Map events can be triggered as the user manipulates a map view within an application using the preference stack. For example, map events can be triggered by pan and zoom operations. The application needs to be aware of changes to the view so that the statistics displayed by the preference stack can be updated to match the associated view displayed by the map.

C. On Add Criteria

Figure 11:
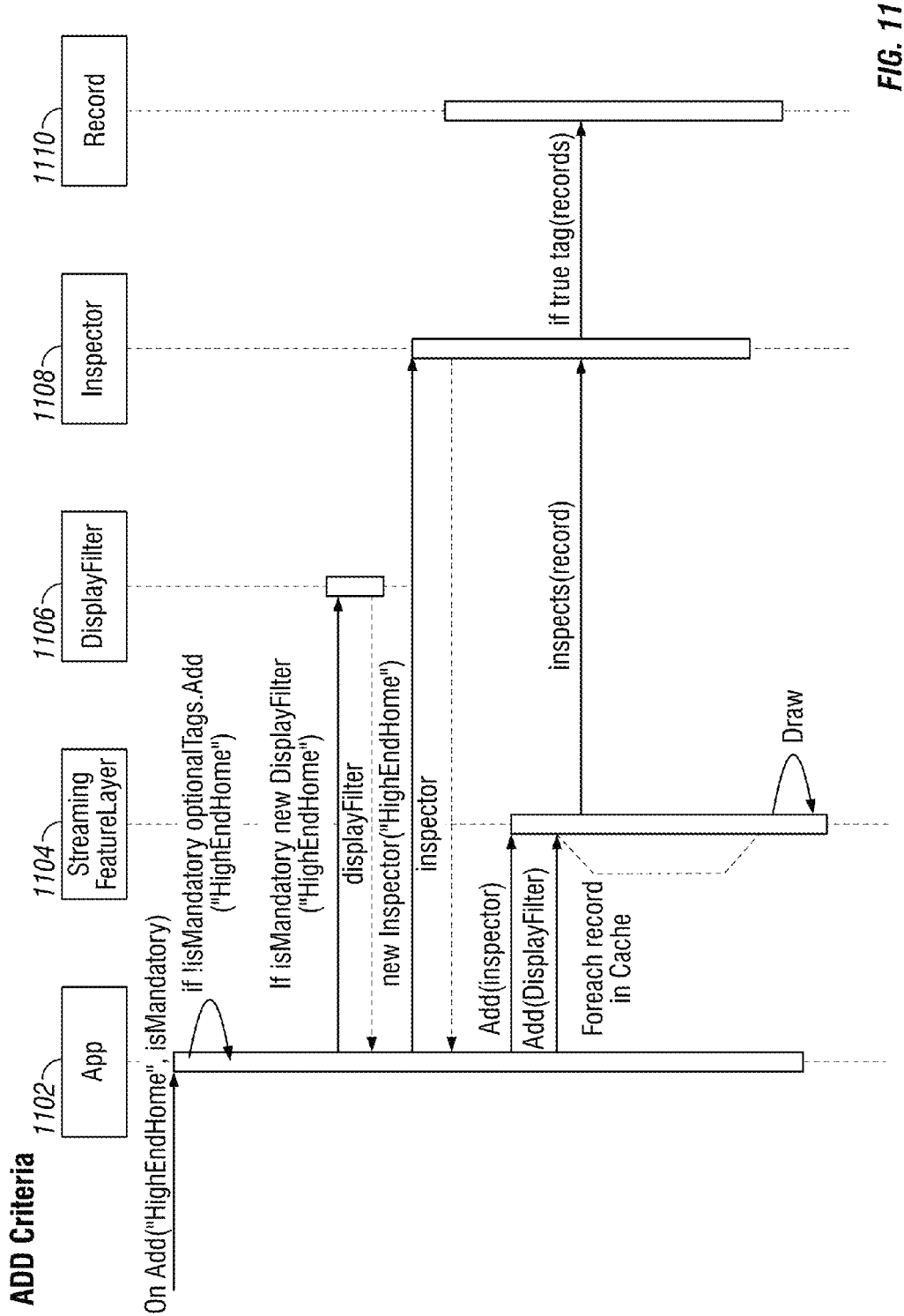
FIG. 11 illustrates a method for processing an "draw" event, according to an example embodiment.

FIG. 11 illustrates an example method for processing an "on add criteria" event. An "on add criteria" event can be generated when the user adds a new criterion to the preference stack. According to an embodiment, the preference stack user interface can include a button or other interface component that allows a user to add a new criterion object to the stack. In response to creating a new criterion object, an "on add criteria" event can be generated by the application or the preference stack user interface. FIG. 11 illustrates the steps that can be taken in response to a new criterion object being added, including the processing steps performed by various layers, which may include receiving the event and updating the display of the preference stack and the application in which the preference stack is being used to select the object from a plurality of objects.

D. SFL Draw

Figure 12:
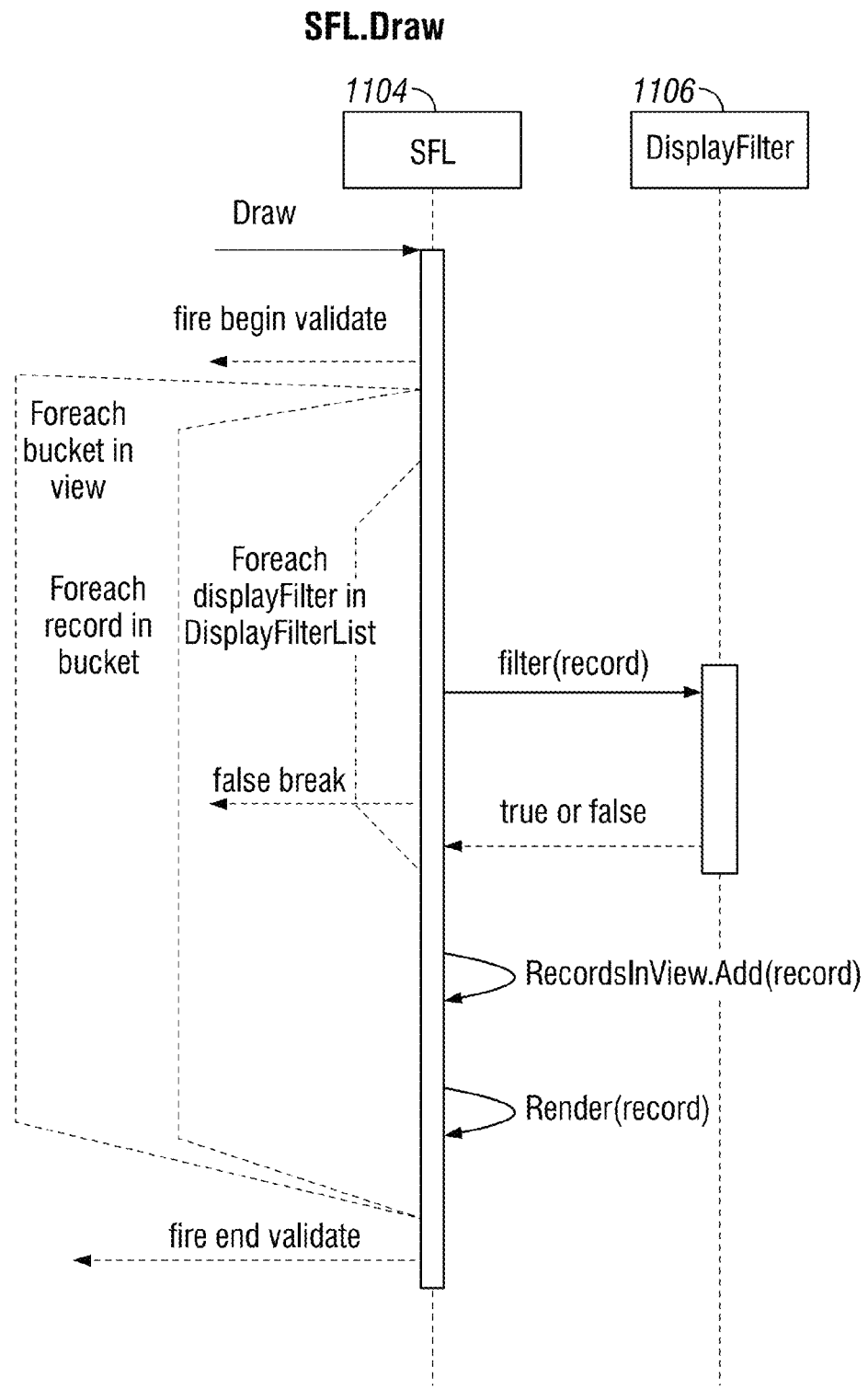
FIG. 12 illustrates a method for processing an "on add criteria" event, according to an example embodiment.

FIG. 12 illustrates an example method for processing a "draw" event. In an embodiment, a draw event can be generated when the application needs to update the display of the preference stack and/or an associated application that is displaying information associated with the preference stack, such as search results from a real estate listing. Various user actions can cause a draw event to be generated, such as the user panning or zooming a map window used to display search results in an application, or criterion objects being added or removed from the preference stack.

E. On Remove Criteria

Figure 13:
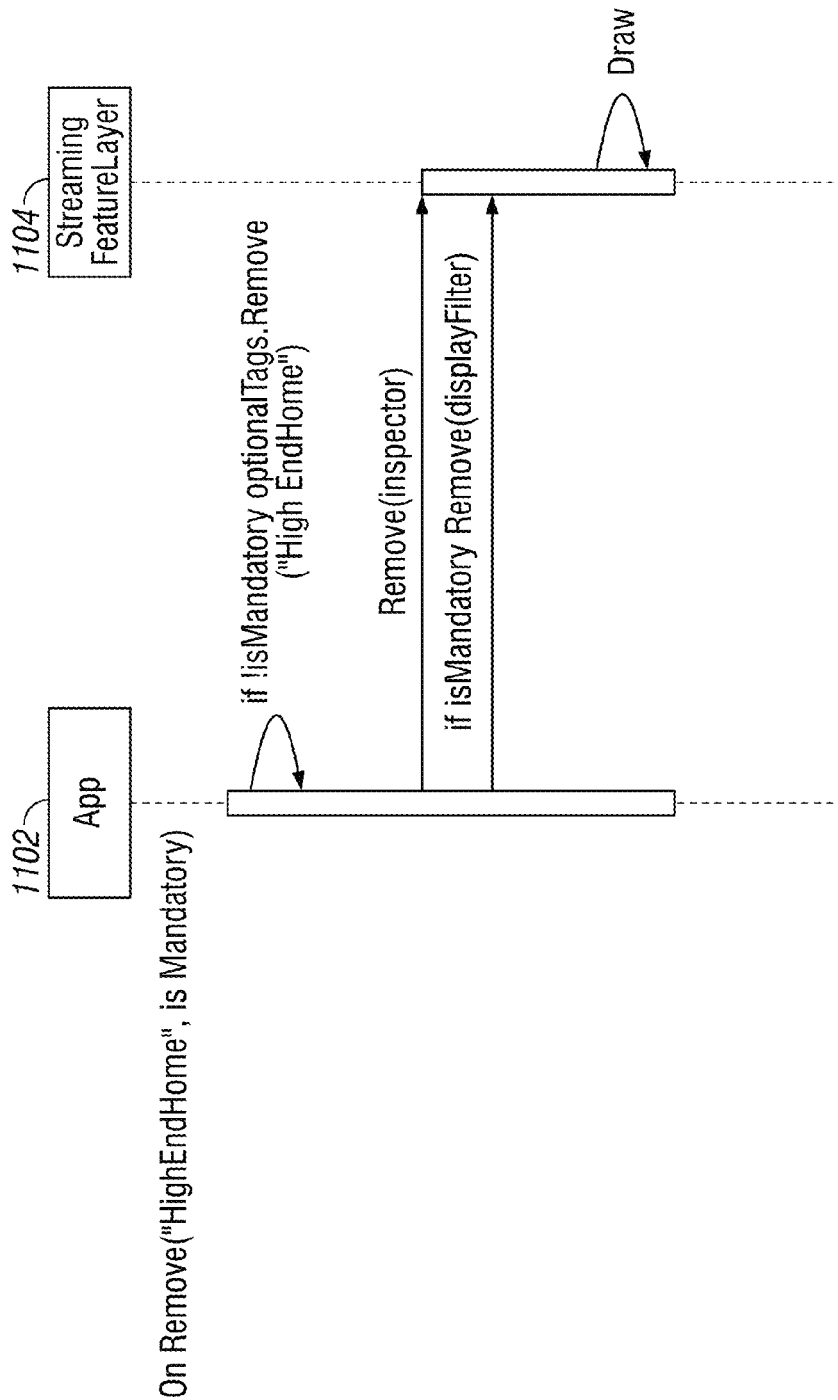
FIG. 13 illustrates a method for removing a criterion object from a preference stack, according to an example embodiment.

An "on remove criteria" event can be generated when the user removes a criterion object from the preference stack. According to an embodiment, the preference stack user interface can include a button or other interface component that allows a user to remove a criterion object from the stack. In response to removing a criterion object, an "on remove criteria" event can be generated by the application or the preference stack user interface. FIG. 13 illustrates the steps that can be taken in response to removing a criterion object, including the processing steps performed by various layers, which may include receiving the event and updating the display of the preference stack and the application in which the preference stack is being used to select the object from a plurality objects.

F. On Pan

Figure 14:
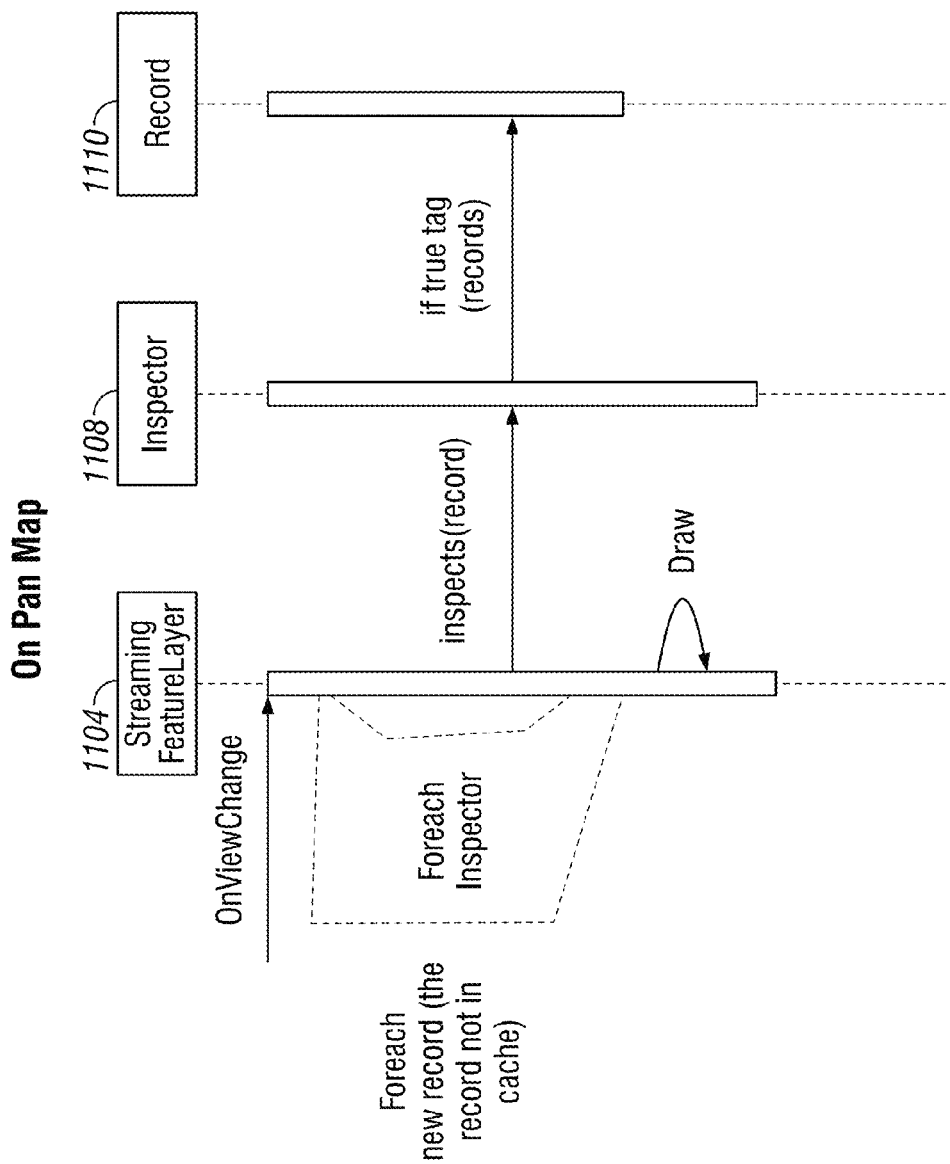
FIG. 14 illustrates a method for processing an "on pan" event, according to an example embodiment.

FIG. 14 illustrates an example method for processing an "on pan" event. In an embodiment, an "on pan" event can be generated when the user pans or scrolls the view in a mapping window or other data display window of an application being used to display data associated with the preference stack.

According to an embodiment, other events, such as an "on mouse over" event and an "on mouse out" event can also be generated in response to user interactions with the preference stack. For example, an "on mouse event" can be generated when the user moves the mouse pointer over a criterion object in the preference stack. As described above, the preference stack and the results interface (e.g., a map of matching results) can be updated to include only results that satisfy the criterion associated with the criterion object. An "on mouse out" event can be generated when the user moves the mouse pointer off of the criterion object, causing the preference stack interface and the results interface to be updated as described above.

III. Pseudocode

The following is an example of pseudocode for some of the objects that can be used to implement embodiments of the present invention.

```
class App
{
StreamingFeatureLayer sfl;
void onClickButtonAddCriteria(String name, bool isMandatory)
{
sfl.Inspectors.Add(new PoolInspector("_Pools")); //Inspectors will throw an event Add Criteria
//and SFL listen to it and call OnAddInspector
if (isMandatory) sfl.DisplayFilters.Add(new DisplayFilter(name));
sfl.Draw( );
}
void onClickButtonRemoveCriteria(String name, bool isMandatory)
{
if (isMandatory)
{
DisplayFilter dp = getDisplayFilter(name);
sfl.DisplayFilters.Remove(dp);
}
Inspector ip = getInspector(name);
sfl.Inspectors.Remove(ip); //Inspectors will throw an event Remove Criteria
//and SFL listen to it
sfl.Draw( );
}
}
class StreamingFeatureLayer : FeatureLayer
{
public ObservableCollection<Inspector> Inspectors; //list of inspectors
public ObservableCollection<DisplayFilter> DisplayFilters;
//list of DisplayFilters
public void OnInspectorsChanged(object sender, EventArgs e)
{
if (e.Action == Add)//if Add function was called
{
foreach (Record rec in AllRecords)
{
(Inspector)e.NewItem.Inspect(rec);
}
}
}
public void Draw( )
```

```
{
foreach (AbstractRecord record in records)
{
bool isPass = true;
//filter record by using DisplayFilters list
foreach (DisplayFilter displayFilter in DisplayFilters)
{
if (!displayFilter.Filter(record)) isPass = false;
}
if (isPass) Draw(record);
}
}
public void OnViewChange( )
{
//tag new records
foreach (Record rec in NewRecord_Not_In_Cache)
foreach (Inspector ip in Inspectors)
ip.Inspect(rec);
Draw( );
}
}
```

IV. Additional Features

In embodiments, additional features may be combined with or integrated into the preference stack. Some of these additional features will now be described.

A. Derivation of Preference Stack Criteria

In an embodiment, one or more preference criteria may be automatically derived from a user search and added to the preference stack. A user may input one or more search criteria using a user interface comprising search inputs (e.g., textboxes, drop-down menus, etc.), and submit the search criteria to an application (e.g., client application, or server application, such as a web application). The application may receive the one or more search criteria and derive one or more preference criteria from the search criteria. These preference criteria may then be automatically added to a preference stack, which may be manipulated by the user, as discussed above.

For example, in the context of a property search application, if the search inputs comprise a specified number of bedrooms, the application may assume that the user would like to view properties with the specified number of bedrooms as well as properties with a greater number of bedrooms. In other words, the application may turn the specified number of bedrooms into a preference for a number of bedrooms that is equal to or greater than the specified number. Thus, if, for example, the specified number of bedrooms is three, greater preference will be given to properties with four bedrooms than properties with two bedrooms with respect to this criterion. Practically speaking, the properties with four bedrooms will be associated with a higher score for this criterion than the properties with two bedrooms. As another example, if the search inputs comprise a price, the application may convert the specified price into a range of prices encompassing the specified price.

Additionally or alternatively, the application may initially automatically populate the preference stack with one or more preference criteria based on a user or buyer profile and/or one or more rules. For example, for a couple with two young pre-school-age children and a specified household income seeking a short- to medium-term starter home, the application may automatically determine and populate the preference stack with a set of preferences that include a price range criterion derived from the specified household income, family-friendly criterion, good investment profile criterion, etc. This automatic selection of preferences based on a buyer's profile may simplify the user interface and bring up pertinent issues to assist a buyer or an agent for the buyer in matching the buyer to a property.

B. Charts

In an embodiment, the user interface comprising the preference stack may also comprise one or more charts or graphs in order to facilitate visualization and analysis of the displayed data and/or user-selected preferences. For instance, the preference stack and graphs may be presented on separate tabs or frames of the same user interface. Alternatively, the one or more graphs may be presented on their own, and separate from embodiments which include a preference stack. In the illustrated embodiment, a user may select input 1640 to be provided a view of the preference stack. It should be understood that the preference stack may have a similar input which provides the user with the view of graphs 1610 and 1620 illustrated in FIG. 16.

Figure 16:
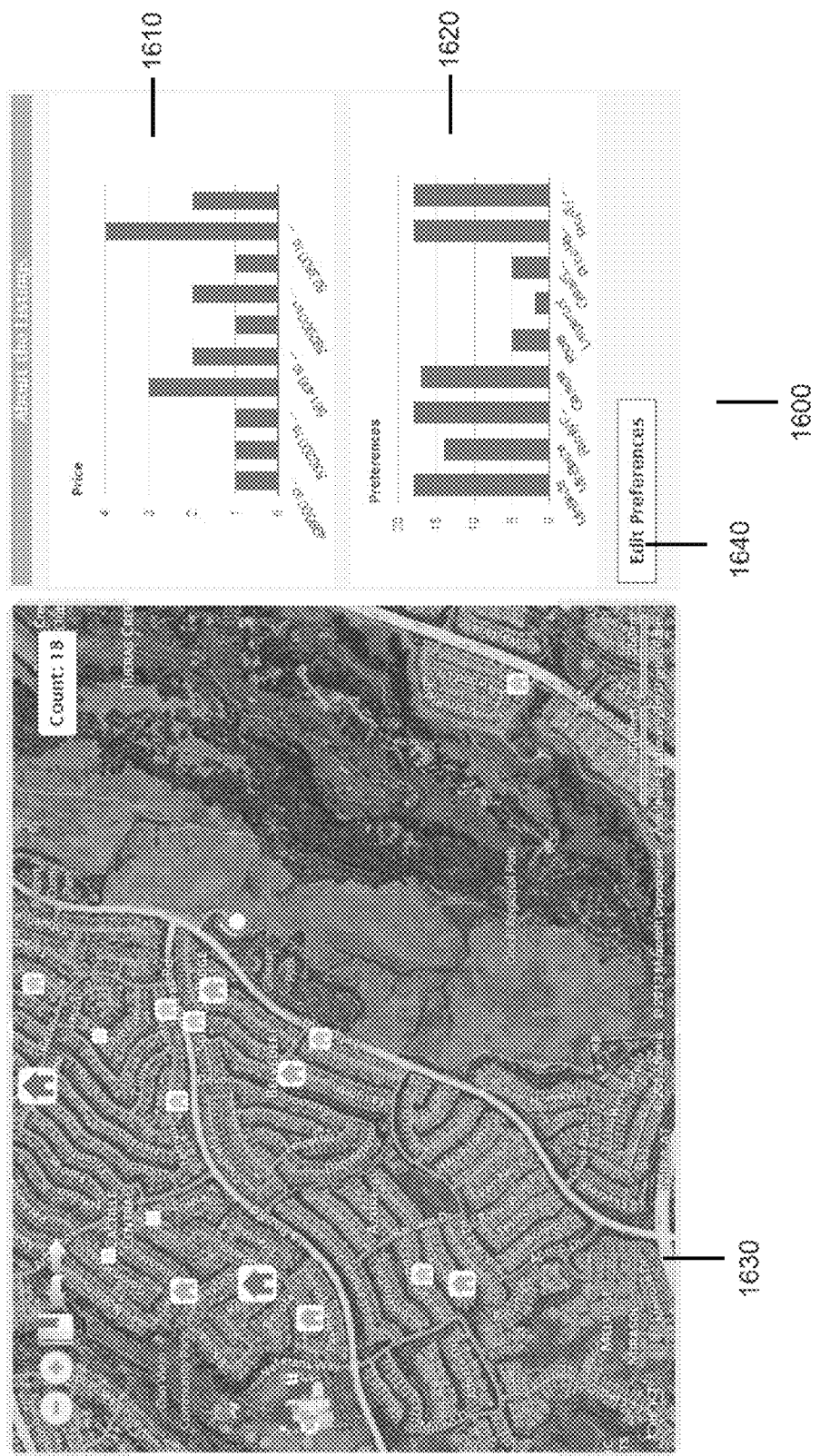
FIG. 16 illustrates a user interface that can be used to enhance a view of data, according to an embodiment.

FIG. 16 illustrates an example user interface 1600 comprising one or more graphs or charts, according to an embodiment. In this example, two graphs 1610 and 1620 are presented. However, it should be understood that one, three, four, or any other number of graphs may be presented.

Chart 1610 may be an attribute-specific chart that represents data related to a user-selected attribute. For instance, user interface 1600 may comprise an input (e.g., a drop-down menu) (not shown) from which a user may select an attribute to be graphed from a plurality of available attributes. In the context of a property-related application, examples of such attributes may include, without limitation, price, number of bedrooms, number of bathrooms, school rating, square footage, and any other attributes that may be segmented into discrete buckets representing a range of values. In the illustrated example, graph 1610 represents a price chart, resulting, for example, from a user selection of a price attribute from a list of possible attributes.

In response to a user selection of an attribute (e.g., price attribute), the application (e.g., client application, or server application such as a web application) segments data matching the user's current search criteria (i.e., search results)—which may have been specified using the preference stack, as discussed above—into two or more values or ranges of values, which together represent the entire range of values for the selected attribute within the search results. For instance, if a user selects the price attribute, the application may segment the user's search results by price into buckets along a spectrum from lowest price to highest price. The number of segments or buckets may be a system or user setting, and may be the same or different for each available attribute.

Using the example illustrated in FIG. 16, if the search results comprise eighteen property records with price attributes ranging from $499,000 to $654,999, the application may generate ten separate buckets, each representing a range of $15,600, i.e., a total range of $156,000. In other words, the application may subtract the high price from the low price, add one, and divide the sum by the number of buckets (i.e., (($654,999–$499,000)+1)/10). This is simply one example. It should be understood that other methods or algorithms for dividing a range of attribute values into discrete buckets may be used.

Next, the application associates each property record with one of the ten buckets, and generates attribute-specific graph 1610. In graph 1610, each bar represents the number of property records within one of the ten buckets. For example, graph 1610 may represent a segregation of eighteen property records with the price attributes illustrated in Table 1 into ten buckets, as illustrated in Table 1. Representations of these eighteen property records may be visually depicted on map display 1630, according to their respective geographical locations.

TABLE 1

Example Bucket and Price Attribute Distribution

| Bucket No. | Range of Attribute Values | Record Attributes Satisfying Range of Values |
|---|---|---|
| 1 | $499,000-$514,599 | $499,000 |
| 2 | $514,600-$530,199 | $519,900 |
| 3 | $530,200-$545,799 | $539,000 |
| 4 | $545,800-$561,399 | $549,000; $549,999; and $559,000 |
| 5 | $561,400-$576,999 | $569,000; and $575,000 |
| 6 | $577,000-$592,599 | $589,900 |
| 7 | $592,600-$608,199 | $599,999; and $605,000 |
| 8 | $608,200-$622,799 | $609,900 |
| 9 | $623,800-$639,399 | $625,000; $625,000; $629,999; and $634,900 |
| 10 | $639,400-$654,999 | $649,000; and $654,9999 |

In an embodiment, the bars in attribute-specific graph 1610 or some other representations of the buckets in attribute-specific graph 1610 are selectable by a user. Each bucket represents a discrete range of values for the particular attribute represented in graph 1610 (e.g., in the illustrated example, the price attribute). The application may receive a user's selection of one or more of the bucket representations in graph 1610 and update map display 1630 based on the user's selection. For example, as described above, the application may update map display 1630 to visually emphasize representations of property records associated with attribute values satisfying the range of values represented by the selected bucket representation(s) over representations of property records not associated with attribute values satisfying the range of values represented by the selected bucket representation(s). Alternatively, the application may update map display 1630 to only display representations of property records associated with attribute values satisfying the range of values represented by the selected bucket representation(s).

In an embodiment, user interface 1600 may also comprise a preference graph 1620 which indicates the number of records satisfying each of at least a subset of the preferences selected and arranged by the user in the preference stack, as described above. It should be understood that preference graph 1620 may comprise a numerical representation of all preferences in the user's preference stack, a predefined number of preferences in the preference stack (e.g., the ten most impactful preferences, the first ten preferences at the top of the preference stack, etc.), all non-mandatory preferences in the preference stack, all mandatory preferences in the preference stack, or any other subset of preferences in the preference stack.

In FIG. 16, preference graph 1620 is illustrated as a bar graph representing a number of property records satisfying each preference in the user's preference stack. Thus, for example, out of the eighteen property records satisfying the user's preference criteria, eighteen satisfy the minimum-bedrooms criterion, fourteen satisfy the minimum-bathrooms criterion, eighteen satisfy the family-friendly criterion, seventeen satisfy the garage-size criterion, five satisfy the pools criterion, two satisfy the lot-size criterion, five satisfy the school-rating criterion, eighteen satisfy the price criterion, and eighteen satisfy the property-type criterion. It should be understood that, in this example, the user may have specified the minimum-bedrooms, family-friendly criterion, price criterion, and property-type criteria as mandatory criteria, and the other criteria as non-mandatory criteria.

In an embodiment, as with attribute-specific graph 1610, the bars in preference graph 1620 or some other representation of one of the preferences in preference graph 1620 are selectable by a user. Each preference in graph 1620 represents a preference listed in the user's preference stack. The application may receive a user's selection of one or more of the preferences in graph 1620 and update map display 1630 based on the user's selection. For example, as described above, the application may update map display 1630 to visually emphasize representations of property records satisfying the selected preference(s) over representations of property records not satisfying the selected preference(s). Alternatively, the application may update map display 1630 to only display representations of property records satisfying the selected preference(s).

In an embodiment, one or more of the charts may depend on another one or more of the charts. For example, graph 1620 may depend on graph 1610. Specifically, when the application receives a selection of one or more of the bucket representations in graph 1610, it may update graph 1620 to graph only those records associated with an attribute values satisfying the range of values represented by the selected bucket representation(s). Thus, if the user selected the bucket representing the range of prices from $623,800 to $639,399 in attribute-specific graph 1610 (i.e., Bucket No. 9 in Table 1), preference graph 1620 would be updated to numerically represent how many of the four property records within that bucket satisfy each of the graphed preferences.

Advantageously, the disclosed graphs or charts enable a user to interact with a single factor (e.g., attribute, such as price) to visualize the impact of that single factor on property location and/or other preferences. For instance, if a user selects a bar (e.g., by clicking on the bar) in attribute-specific graph 1610, preference graph 1620 and display map 1630 may be dynamically updated to graphically and visually represent or emphasize only those records satisfying the selected attribute value or range of attribute values. Thus, in the illustrated example, in which the attribute is a price, the user can immediately see the impact of spending less or more on a property. For example, if the user selects one or more lower-priced buckets (e.g., Bucket Nos. 1-5), the user may see that few, if any, of the property records in the selected bucket(s) satisfy the user-specified school-rating preference criterion.

V. Example System Design

Figure 15:
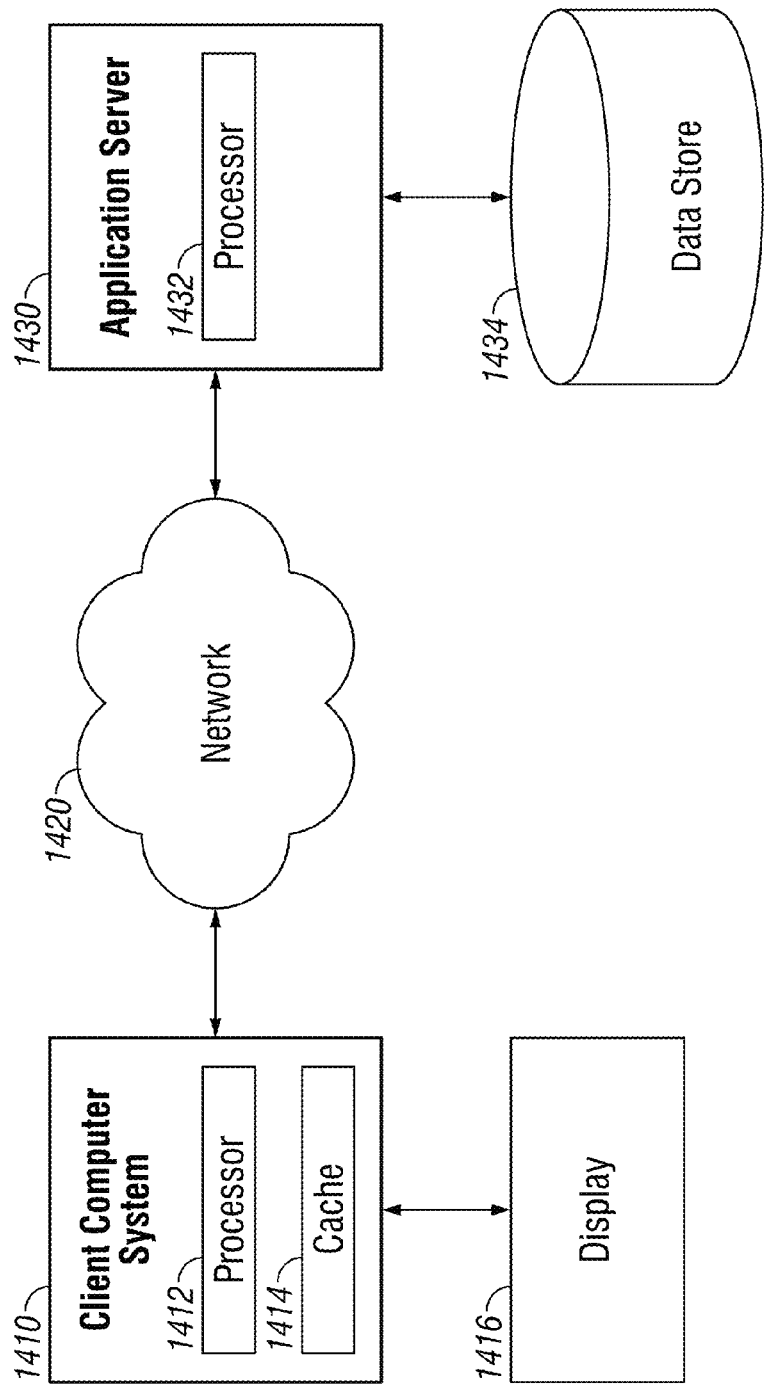
FIG. 15 illustrates a high level block diagram of a system that can be used to implement a preference stack, according to an example embodiment.

FIG. 15 is a high level block diagram of a system that can be used to implement the techniques disclosed herein, according to an embodiment. A client computer system 1410 connects to the web/application server or servers 1430 via one or more wired or wireless network connections 1420. At least one of the network connections can be the Internet. The client computer system 1410 can be any type of computer system capable of network connectivity, and can include a processor 1412 for executing either client software or browser software that enables the computer system to request data from the application server 1430 across the network 1420. For example, the client computer system 1410 can be a laptop computer system, a desktop computer system, a mobile device, such as a mobile phone, a personal digital assistance (PDA), or other type of device that can be capable of network connectivity and executing application software.

The application server 1430 can be a conventional server system, such as a web server, and in some embodiments, the application server 1430 can be implemented using a plurality of servers. The application server 1430 can include a data store 1434 for storing preference stack data as well as search results or other data with which the preference stack can be used to select objects. The application server 1430 can include the data store 1434 implemented on the application server 1430 or the data store 1434 can be implemented in one or more separate data servers. According to some embodiments, the application server 1430 can be configured to select data from one or more external or third party servers (not shown) to retrieve data for one or more layers of data to be displayed to the user.

For example, the application server 1430 can be a web server for a real estate web site, and the data store 1434 can store listing information. In some embodiments, the application server 1430 can access third party data stores for other relevant information, such as tax information, school information, school district information, crime statistics, and/or other property-related information. As described above, this information can be segregated into one or more separate layers of data that can be displayed with the results and used in the criterion objects of the preference stack.

According to one embodiment, a client computer 1410 connects to the application server 1430 via the Internet and downloads a client application to a memory of the client device. The client application can be executed by a processor 1412 of the client device 1410 and can be configured to receive streaming data from the application server 1430. The data can be preserved on the client device 1410 in a client display cache 1414 for the duration of a user session and can be used by the preference stack.

In an embodiment, data can be stored in the local user cache 1414 as the data is received from the server 1430 so that subsequent operations on the data work with the local copies of the data rather than requiring that the data be streamed to the client device 1410 again. The preference stack does not change what data is retrieved from the application server 1430, but merely changes how that data is displayed and interacted with by the user at the client device 1410. Once the data has been streamed from the application server 1430 to the client device 1410, the user can add/remove criterion objects from the preference stack and/or reorder the criterion objects in the stack to visualize the data in different ways without having to submit numerous queries to the application server 1430. This provides an advantage over conventional systems where the user would have to generate multiple queries with different combinations of mandatory and non-mandatory data and then attempt to correlate these results in order to make a decision. Embodiments of the present invention overcome this problem by caching the data locally and allowing the user to visualize the data in different ways by modifying the preference stack.

According to some embodiments, a thin-client can be implemented where a majority of the processing work is delegated to the application server 1430 and the thin-client on the client device 1410 performs more limited processing and displays the results of processing provided by the application server 1430. According to an embodiment, a user cache can be implemented on the application server 1430 rather than the client computer system 1410 when a thin-client implementation is to be used, since much of the processing has been delegated to the application server 1430.

According to some server-side embodiments (i.e., where much of the processing work is delegated to the application server 1430), application server 1430 can create multiple versions of the map display at application server 1430. In a further embodiment, the application server 1430 can generate two or more versions of the map display in parallel on a single pass through the data set. The data set may be stored in a cache on application server 1430. Application server 1430 may process the data set stored in a cache or other memory (e.g., data store 1434) to simultaneously build different versions of a map display of the same data set.

In an embodiment, the multiple versions of the map display can be generated in advance and/or anticipation of a user interaction with the preference stack or map interface. For example, one version of the map display can be generated in advance of the user highlighting (e.g., by mousing over) a criterion in the preference stack, while a second version of the map display can be generated in advance of the user highlighting a different criterion in the preference stack. The application server 1430 may be configured to generate in advance and/or anticipate any potential user interaction or subset of potential user interactions, including but not limited to highlighting criteria, changing the order of criteria in the preference stack, adding or removing criteria from the preference stack, making a criterion mandatory or non-mandatory, and panning or zooming the map display to change the view of the geographic area displayed. One potential advantage of such an embodiment is that each of the multiple versions of a map display can be quickly provided to a client device, thereby reducing the time needed to update the map display in response a user interaction.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose computer processor, a digital signal processor (DSP), an application specific integrated circuit (ASIC), a field programmable gate array (FPGA) or other programmable hardware device, discrete gate or transistor logic, discrete hardware components, or any combination thereof designed to perform the functions described herein. A general-purpose processor can be a microprocessor, but in the alternative, the processor can be any other hardware processor, controller, or microcontroller. A processor can also be implemented as a combination of computing devices, for example, a combination of a DSP and a microprocessor, a plurality of microprocessors, or one or more microprocessors in conjunction with a DSP core.

The steps of a method or algorithm described in connection with the embodiments disclosed herein can be embodied directly in hardware, in a software module executed by a processor, or in a combination of the two. A software module can reside in the computer or processor-accessible or readable storage media, including but not limited to RAM memory, flash memory, ROM memory, EPROM memory, EEPROM memory, registers, hard disk, a removable disk, a CD-ROM, or other form of storage medium such as a computer-readable storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A system for customizing a display of property records in combination with a virtual map, the system comprising:
   at least one computer processor; and
   at least one executable software module configured to, when executed by the at least one computer processor,
      identify a plurality of property records based on a plurality of preference criteria,
      generate a virtual map comprising representations of the plurality of property records,
      receive a selection of one of a plurality of property attributes,
      determine a range of values for the selected property attribute based on the plurality of property records,
      divide the range of values into a plurality of discrete segments,
      associate each of the plurality of property records with one of the plurality of discrete segments,
      generate a first graph comprising a plurality of first visual representations, wherein each of the plurality of first visual representations corresponds to one of the plurality of discrete segments, comprises a visual representation of a number of the plurality of property records which are associated with the corresponding discrete segment, and is selectable by a user,
      generate a second graph comprising a plurality of second visual representations, wherein each of the plurality of second visual representations corresponds to one of a subset of two or more of the plurality of preference criteria and comprises a visual representation of a number of the plurality of property records which satisfy the corresponding preference criterion,
      receive a selection of one or more of the plurality of first visual representations, and,
      in response to the selection of one or more of the plurality of first visual representations,
         update the virtual map to visually identify a subset of the representations of the plurality of property records which are associated with the discrete segment corresponding to the selected one or more of the plurality of first visual representations, and
         update the second graph such that each of the plurality of second visual representations comprise a visual representation of a number of the plurality of property records which satisfy the corresponding preference criterion and are associated with the discrete segment corresponding to the selected one or more of the plurality of first visual representations.

2. The system of claim 1, wherein each of the plurality of second visual representations is selectable by a user, and wherein the at least one executable software module is further configured to:
   receive a selection of one or more of the plurality of second visual representations; and,
   in response to the selection of one or more of the plurality of second visual representations, update the virtual map to visually identify a subset of the representations of the plurality of property records which satisfy the preference criteria corresponding to the selected one or more of the plurality of second visual representations.

3. The system of claim 1, wherein the at least one executable software module is further configured to:
   detect a mouse-over of one of the plurality of first visual representations;
   in response to the mouse-over event, remove representations of the plurality of property records from the virtual map which are not associated with the discrete segment corresponding to the moused-over first visual representation;
   detect a mouse-out of the moused-over first visual representation; and,
   in response to the mouse-out, redisplay the removed representations of the plurality of property records on the virtual map.

4. The system of claim 1, wherein the at least one executable software module is further configured to:
   detect a mouse-over of one of the plurality of second visual representations;
   in response to the mouse-over event, remove representations of the plurality of property records from the virtual map which do not satisfy the preference criterion corresponding to the moused-over second visual representation;
   detect a mouse-out of the moused-over second visual representation; and,
   in response to the mouse-out, redisplay the removed representations of the plurality of property records on the virtual map.

5. The system of claim 1, wherein the at least one executable software module is further configured to:
   receive one or more search inputs from a user; and
   generate the plurality of preference criteria based on the one or more search inputs.

6. The system of claim 1, wherein the at least one executable software module is further configured to:
   retrieve the plurality of property records from a remote data store over at least one network; and
   store the plurality of property records in a local cache.

7. The system of claim 1, wherein the virtual map comprises a map of a geographic region, wherein each of the plurality of property records is associated with a geographic location, and wherein the at least one executable software module is further configured to render each of the representations of the plurality of property records on the map of the geographical region at the geographic location associated with its corresponding property record.

8. A system for customizing a display of property records in combination with a virtual map, the system comprising:
   at least one computer processor; and
   at least one executable software module configured to, when executed by the at least one computer processor, identify a plurality of property records based on a plurality of preference criteria,
   generate a virtual map comprising representations of the plurality of property records,
   receive a selection of one of a plurality of property attributes,
   determine a range of values for the selected property attribute based on the plurality of property records,
   divide the range of values into a plurality of discrete segments,
   associate each of the plurality of property records with one of the plurality of discrete segments,
   generate a first graph comprising a plurality of first visual representations, wherein each of the plurality of first visual representations corresponds to one of the plurality of discrete segments, comprises a visual representation of a number of the plurality of property records which are associated with the corresponding discrete segment, and is selectable by a user,
   receive a selection of one or more of the plurality of first visual representations,
   in response to the selection of one or more of the plurality of first visual representations, update the virtual map to visually identify a subset of the representations of the plurality of property records which are associated with the discrete segment corresponding to the selected one or more of the plurality of first visual representations,
   generate a preference stack comprising a representation of a first property attribute and a representation of a second property attribute,
   receive an indication that the second property attribute should be given more weight than the first property attribute, and,
   in response to the indication, update the representations of the plurality of property records of the virtual map, wherein representations of property records which meet the second property attribute are visually emphasized over representations of property records which meet the first property attribute but do not meet the second property attribute.

9. A method for customizing a display of property records in combination with a virtual map, the method comprising, by at least one hardware processor:
   identifying a plurality of property records based on a plurality of preference criteria;
   generating a virtual map comprising representations of the plurality of property records;
   receiving a selection of one of a plurality of property attributes;
   determining a range of values for the selected property attribute based on the plurality of property records;
   dividing the range of values into a plurality of discrete segments;
   associating each of the plurality of property records with one of the plurality of discrete segments;
   generating a first graph comprising a plurality of first visual representations, wherein each of the plurality of first visual representations corresponds to one of the plurality of discrete segments, comprises a visual representation of a number of the plurality of property records which are associated with the corresponding discrete segment, and is selectable by a user;
   generating a second graph comprising a plurality of second visual representations, wherein each of the plurality of second visual representations corresponds to one of a subset of two or more of the plurality of preference criteria and comprises a visual representation of a number of the plurality of property records which satisfy the corresponding preference criterion;

receiving a selection of one or more of the plurality of first visual representations; and, in response to the selection of one or more of the plurality of first visual representations, updating the virtual map to visually identify a subset of the representations of the plurality of property records which are associated with the discrete segment corresponding to the selected one or more of the plurality of first visual representations, and updating the second graph such that each of the plurality of second visual representations comprise a visual representation of a number of the plurality of property records which satisfy the corresponding preference criterion and are associated with the discrete segment corresponding to the selected one or more of the plurality of first visual representations.

10. The method of claim 9, wherein each of the plurality of second visual representations is selectable by a user, and wherein the method further comprises:

receiving a selection of one or more of the plurality of second visual representations; and, in response to the selection of one or more of the plurality of second visual representations, updating the virtual map to visually identify a subset of the representations of the plurality of property records which satisfy the preference criteria corresponding to the selected one or more of the plurality of second visual representations.

11. The method of claim 9, further comprising:

detecting a mouse-over of one of the plurality of first visual representations;

in response to the mouse-over event, removing representations of the plurality of property records from the virtual map which are not associated with the discrete segment corresponding to the moused-over first visual representation;

detecting a mouse-out of the moused-over first visual representation; and, in response to the mouse-out, redisplaying the removed representations of the plurality of property records on the virtual map.

12. The method of claim 9, further comprising:

detecting a mouse-over of one of the plurality of second visual representations;

in response to the mouse-over event, removing representations of the plurality of property records from the virtual map which do not satisfy the preference criterion corresponding to the moused-over second visual representation;

detecting a mouse-out of the moused-over second visual representation; and, in response to the mouse-out, redisplaying the removed representations of the plurality of property records on the virtual map.

13. The method of claim 9, further comprising:

receiving one or more search inputs from a user; and generating the plurality of preference criteria based on the one or more search inputs.

14. The method of claim 9, further comprising:

retrieving the plurality of property records from a remote data store over at least one network; and storing the plurality of property records in a local cache.

15. The method of claim 9, wherein the virtual map comprises a map of a geographic region, wherein each of the plurality of property records is associated with a geographic location, and wherein the method further comprising rendering each of the representations of the plurality of property records on the map of the geographical region at the geographic location associated with its corresponding property record.

16. A method for customizing a display of property records in combination with a virtual map, the method comprising, by at least one hardware processor:

identifying a plurality of property records based on a plurality of preference criteria;

generating a virtual map comprising representations of the plurality of property records;

receiving a selection of one of a plurality of property attributes;

determining a range of values for the selected property attribute based on the plurality of property records;

dividing the range of values into a plurality of discrete segments;

associating each of the plurality of property records with one of the plurality of discrete segments;

generating a first graph comprising a plurality of first visual representations, wherein each of the plurality of first visual representations corresponds to one of the plurality of discrete segments, comprises a visual representation of a number of the plurality of property records which are associated with the corresponding discrete segment, and is selectable by a user;

receiving a selection of one or more of the plurality of first visual representations;

in response to the selection of one or more of the plurality of first visual representations, updating the virtual map to visually identify a subset of the representations of the plurality of property records which are associated with the discrete segment corresponding to the selected one or more of the plurality of first visual representations;

generating a preference stack comprising a representation of a first property attribute and a representation of a second property attribute;

receiving an indication that the second property attribute should be given more weight than the first property attribute; and, in response to the indication, updating the representations of the plurality of property records of the virtual map, wherein representations of property records which meet the second property attribute are visually emphasized over representations of property records which meet the first property attribute but do not meet the second property attribute.

* * * * *